(12) United States Patent
Wilson et al.

(10) Patent No.: US 12,020,045 B1
(45) Date of Patent: Jun. 25, 2024

(54) ARCHITECTURE FOR BUILDING NATIVE GRAPHICAL USER INTERFACES

(71) Applicant: Block, Inc., Oakland, CA (US)

(72) Inventors: Jesse Wilson, Kitchener (CA); Jacob Wharton, McMurray, PA (US); Eric Firestone, West Lake Hills, TX (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/344,603

(22) Filed: Jun. 29, 2023

Related U.S. Application Data

(60) Provisional application No. 63/470,577, filed on Jun. 2, 2023.

(51) Int. Cl.
  *G06F 9/451* (2018.01)
(52) U.S. Cl.
  CPC .................................... *G06F 9/451* (2018.02)
(58) Field of Classification Search
  CPC ....................................................... G06F 9/451
  See application file for complete search history.

(56) References Cited

U.S. PATENT DOCUMENTS 9,836,441 B2 * 12/2017 Furtwangler ......... G06F 40/143
11,392,284 B1 * 7/2022 Bluhm ................ G06F 9/44505

* cited by examiner

*Primary Examiner* — Andrey Belousov
(74) *Attorney, Agent, or Firm* — Polsinelli PC

(57) ABSTRACT

Systems and methods are disclosed for updating an application's user interface (UI) without updating the application. A system provides, for a client device, an application with host instructions having host memory and a guest environment having guest memory. The system receives guest instructions relating to an update to a UI element to be presented via the application's UI without the application being updated. The system selects, based on the client device's platform, a native UI type for the UI element, selected from possible UI types corresponding to different platforms. The system bridges an interaction between a function of the guest instructions and a function of the host instructions without the guest memory and the host memory sharing memory. The system causes the application to display, via the UI, the UI element according to the native UI type based on the bridging and without the application being updated.

20 Claims, 11 Drawing Sheets of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.
ARCHITECTURE FOR BUILDING NATIVE GRAPHICAL USER INTERFACES

CROSS-REFERENCE TO RELATED APPLICATIONS

This application is a non-provisional of U.S. Provisional Application No. 63/470,577 filed on Jun. 2, 2023, entitled, ARCHITECTURE FOR BUILDING NATIVE GRAPHICAL USER INTERFACES, which is hereby expressly incorporated herein by reference in its entirety and for all purposes.

TECHNICAL FIELD

Software applications include graphical user interfaces (GUIs) through which users can receive information and/or provide inputs. Some software applications are released across multiple platforms, for instance across multiple operating systems, device types, and the like. Some user interface (UI) elements can look and/or function differently depending on which platform the user interface elements are displayed using. For instance, a given platform can have a particular UI style or type that is native to that platform.

BRIEF DESCRIPTION OF THE DRAWINGS

The detailed description is set forth with reference to the accompanying figures. In the figures, the left-most digit(s)

DETAILED DESCRIPTION

Figure 1:
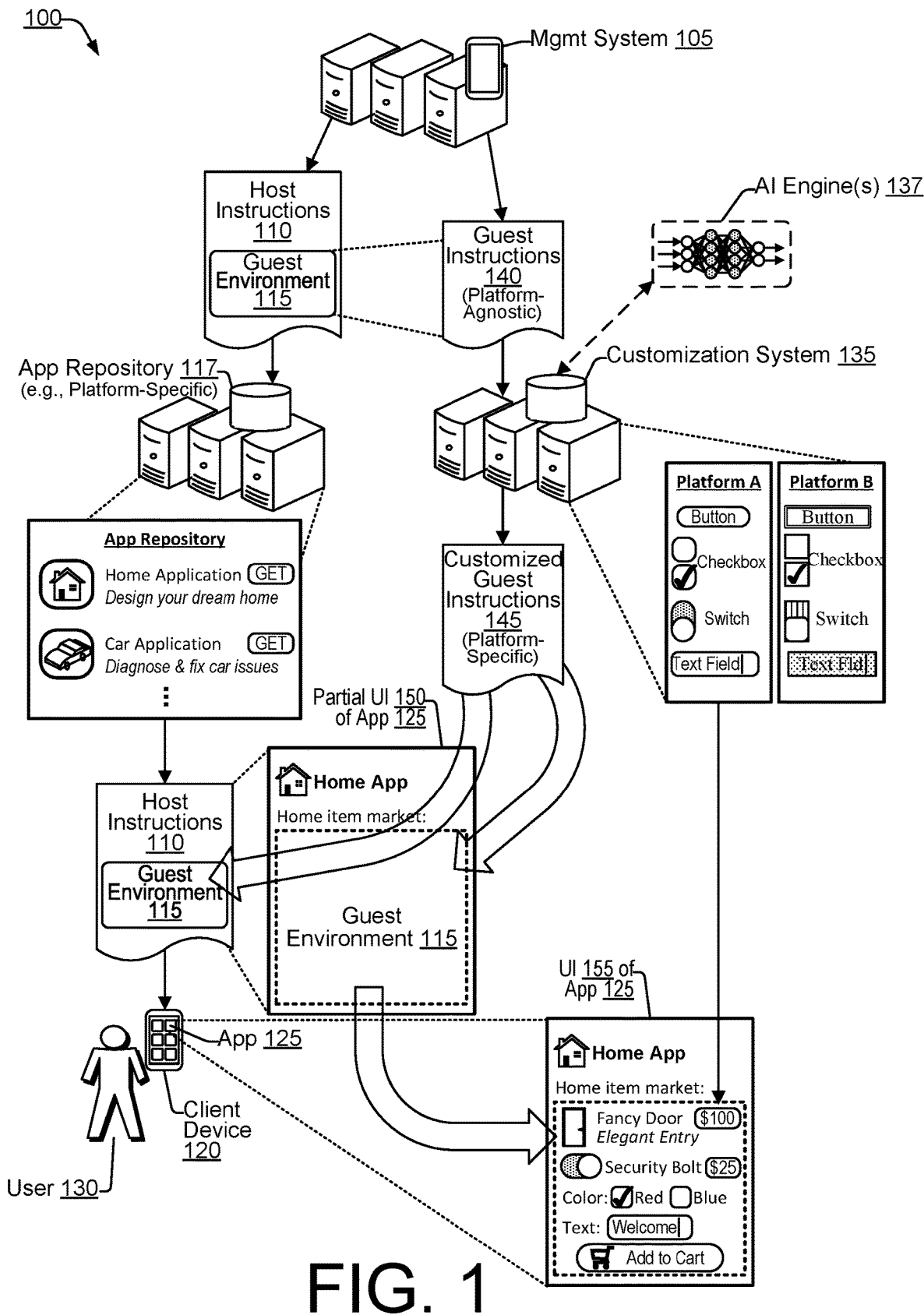
FIG. 1 is a block diagram illustrating an architecture of an application interface customization system, in accordance with some examples.

Systems and methods for updating a user interface of an application without requiring the application as a whole to be updated (e.g., with an up-to-date version from an app store or other app repository) are described herein. In some implementations, the systems and methods disclosed herein use an interface customization system to customize an application. The application includes host instructions and a guest environment. The host instructions include instructions, code, and/or the like that are part of the application when the application is provided to a client device from an app repository (e.g., downloaded from an app store). The guest environment may be provided with the application, and can facilitate the running of guest instructions, code, and/or the like received from a server, to enable the customization of the application. Generally, the application is configured so that the client device starts the application by running the host instructions. Running the host instructions on a client device can run a portion of the application. In some examples, the host instructions are not updated unless the application as a whole is updated (e.g., with a new version from an app repository or app store).

The interface customization system can receive guest instructions to be imported into the application via the guest environment. The interface customization system can receive a platform-agnostic version of the guest instructions, and can customize the guest instructions based on the platform that the client device is running to produce a platform-specific version of the guest instructions. The interface customization system can be configured to be able to customize instructions, code, and/or the like for a number of different platforms. The platforms may include different operating systems or even other applications that can execute certain types of instructions within themselves, such as web browsers. The interface customization system can be configured to customize the guest instructions to generate a platform-specific version of the guest instructions by customizing user interface elements in the platform-agnostic version of the guest instructions to adopt a native user interface type, or native user interface style, that is native to the platform used by the client device. The interface customization system can produce multiple different platform-specific versions of the guest instructions that are customized to different platforms by using different native user interface types, or native user interface styles, that are native to each of those platforms.

In an illustrative example, the guest instructions may identify that a certain user interface should include a button in one location, a toggle switch in a second location, and a text field in a third location. In this illustrative example, the interface customization system can identify that a first client device uses a first operating system, and can identify that under the native user interface style of the first operating system, buttons and toggle switches and text fields should all have rounded edges, that toggle switches should have circular nodes that slide along a background that changes color depending on their state, and that text fields should be left-justified. Thus, the interface customization system can generate a first platform-specific version of the guest instructions for the first client device that applies the native user interface style of the first operating system to the button, toggle switch, and text field identified in the guest instructions. The interface customization system can generate a different second platform-specific version of the guest instructions for a second client device that uses a second operating system, specifically to apply a different native user interface style of the second operating system to the button, toggle switch, and text field identified in the guest instructions.

In some examples, the interface customization system can factor in a combination of several different UI styles, UI attributes, and/or UI preferences to generate a customized version of the guest instructions. For instance, the interface customization system can generate the customized version of the guest instructions to be platform-specific by factoring in a native UI style of a specific platform (e.g., operating system or web browser), to remain recognizable as the app by incorporating app-specific UI style attributes (e.g., by incorporating colors or patterns or icons or other attributes specific to the app), to be personalized by factoring in user-specific style preferences (e.g., large font to accommodate the user's poor eyesight), and/or to be device-tailored by factoring in device-specific style preferences (e.g., arranging or resizing certain UI elements as appropriate to accommodate screen size and orientation). In this way, the interface customization system is able to customize the guest instructions based on a variety of factors to provide an optimized and personalized experience to the user.

The interface customization system can periodically receive guest instructions, can periodically customize those guest instructions (e.g., based on platform and/or app and/or user and/or device) to generate customized guest instructions as discussed above, and can provide the customized guest instructions to be imported into the application via the guest environment without requiring the application as a whole to be updated (e.g., with an up-to-date version from an app store or other app repository) and/or without requiring the application to be restarted. The guest environment (and thus the guest instructions) of the application can have their own guest memory separate from a host memory for the host instructions of the application. This can help to maintain security between the guest instructions and the host instructions, and can ensure that it is safe to keep running the host instructions even as the guest instructions are being dynamically replaced on-the-fly (e.g., in real-time) with updated versions of the guest instructions. In this way, the interface customization system can ensure that the user interfaces that are displayed to the user through the application, and that the user interacts with through the application, are up-to-date and customized for the needs of the platform, the app, the user, and/or the device. Further, the capability of providing guest instructions can enable patches to security vulnerabilities and fixes to bugs to be responsively pushed on-the-fly to affected applications without requiring the application as a whole to be updated. In this way, security and reliability of the application is enabled.

The systems and methods described herein (e.g., as performed using the interface customization system) provide technical solutions to a number of technical problems. For instance, software applications are generally divided into local functions and remote functions. For a software application running on a client device, the software application's local functions are performed locally by the client device, as part of running the code (e.g., the instructions) of the software application. The software application's remote functions, on the other hand, can be performed (at least in part) by a server or other remote device that is external to the client device. Local functions benefit from running more quickly than remote functions and not needing network access (the way remote functions do), but suffer from not being reliably up-to-date, since whether or not a local function is up-to-date depends on whether or not the user has updated the app recently (e.g., downloaded an up-to-date version of the app from an app store or other app repository recently). Remote functions (e.g., running at least in part on a remote server) benefit from being reliably up-to-date (since the server can be updated without having to rely on the user), but suffer from requiring network access (e.g., to communicate with the remote server) and being slow due to network latency delays (e.g., from communicating with the server).

The systems and methods described herein (e.g., as performed using the interface customization system) provide technical solutions by combining the technical benefits of both local functions and remote functions, and mitigates technical problems by mitigating the technical downsides of both local functions and remote functions. For instance, a customized application with a guest environment running up-to-date customized guest instructions is reliably up-to-date without having to rely on the user updating the app as a whole (e.g., downloading an up-to-date version of the app from an app store or other app repository). Functions in such a customized application run as quickly and efficiently as local functions, since the functions of the customized guest instructions can be run locally as local functions, and do not suffer from the network latency since communications with a remote server are not needed to keep the app working (e.g., as in remote functions). Such a customized application can continue to fully function without a network (e.g., internet access) accessible to the client device, unlike an application that relies on remote functions. Thus, the customized application with customized guest instructions provides a reduction in network latency compared to an application that relies on remote functions, and provides improved flexibility and reliability compared to an application that relies on remote functions.

Another technical problem is that, traditionally, when designing applications for multiple different platforms, software developers have to either develop and maintain multiple different codebases that fully take advantage of platform-specific functionality (one codebase per platform) or develop and maintain a single universal codebase that specifically ignores or avoids any platform-specific functionality (and thus is often forced to perform certain functions in ways that are sub-optimal for at least one of those platforms). The systems and methods described herein (e.g., as performed using the interface customization system) provide a technical solution to this technical problem by allowing software developers to write and maintain a single set of guest instructions that is then customized by the interface customization system to generate multiple customized platform-specific sets of guest instructions that each apply platform-specific native UI styles and that each take advantage of optimal platform-specific functionality where appropriate. The native UI styles or types can include native styles for various UI elements or UI components, and in some examples can include native UI elements or UI components that might not be available for other platforms. For instance, certain mobile handset platforms (e.g., those configured for Android® operating systems) include a dedicated "back" button (virtual or physical). The interface customization system can allow a customized platform-specific set of guest instructions for such mobile handset platforms to use the dedicated "back" button, and can customize the touchscreen user interface associated with the guest instructions to omit a "back" button from the touchscreen user interface to prevent redundancy. In this way, the systems and methods described herein (e.g., as performed using the interface customization system) provide a technical solution by providing the technical benefits of allowing developers to develop and maintain a single set of guest instructions, while also providing the technical benefits of customizing the guest instructions to fully take advantage of platform-specific functionality, and performing this customization automatically without any need for user input.

In some examples, the guest instructions can be referred to as a downloadable, as downloadable instructions, or as downloadable code. In some examples, the interface customization system can include an inspector engine that inspects the guest instructions to identify interface code that is specific to one or more UI elements. The interface customization system can link the identified interface code to a customization profile indicative of customization(s) associated with specific platforms, the app itself, the user's preferences, the device, or a combination thereof. The interface customization system can customize the interface code in the guest instructions based on the customization(s) indicated in the customization profile to generate customized interface code for the guest instructions, and therefore to generate customized guest instructions. The interface customization system can provide the customized interface code to the guest instructions to generate the customized guest instructions for the client device before making the guest instructions (e.g., the customized guest instructions) available to the client device (e.g., to be run in the guest environment). The identification of interface code in the guest instructions by the inspector engine can be behavior-based, for instance being based on an analysis by the interface customization system as to whether the behavior of the interface code is operable to influence at least one UI element of a UI of the application. The customization approach discussed herein (e.g., using the customization profile) can allow for a flexible and nuanced customization and tailoring of the application's guest instructions based on specific platforms, the app itself, the user's preferences, the device, or a combination thereof. The customization approach discussed herein (e.g., using the customization profile) can allow for customization and tailoring of the application's guest instructions before the guest instructions reach the client device, and allows for the guest instructions to be customized to the client device based on behavior-based information about expected behavior of certain user interface elements under different platforms, in the specific app being customized, under the specific user's preferences, and on the specific client device set to run the application.

Various aspects of the application will be described with respect to the figures. FIG. 1 is a block diagram illustrating an architecture of an application interface customization system 100. The application interface customization system 100 includes a management system 105 through which software developers can manage code for an application (e.g., application 125) to be deployed to client devices (e.g., client device 120). The management system 105 can be used to develop, deploy, update, and/or maintain both host instructions 110 and guest instructions 140 for the application 125. The management system 105 can include one or more computing systems of any of the types of computing systems discussed herein.

The management system 105 can generate and/or receive host instructions 110 for the application 125. The host instructions 110 can include instructions that generate a guest environment 115 within the application 125. The guest environment 115 is configured to and is operable to run guest instructions (e.g., the guest instructions 140 and/or customized guest instructions 145) within the application 125. In some examples, the guest environment 115 includes an interpreter configured to interpret the guest instructions (e.g., at runtime) to run the guest instructions within the guest environment 115 of the application 125. In some examples, the interpreter can also be used to interpret at least a subset of the host instructions 110. In some examples, the guest environment 115 includes a compiler configured to compile the guest instructions to be run within the guest environment 115 of the application 125. In some examples, the compiler can recompile the guest instructions on the fly whenever the guest instructions are updated. In some examples, the compiler can compile the guest instructions together with at least some of the host instructions 110, and/or together with at least some instructions corresponding to the guest environment 115. In some examples, the application 125 is structured so that the host instructions 110 and the guest environment 115 have separate and/or distinct memory structures that do not overlap, so there is no shared memory between the host instructions 110 and any guest instructions running in the guest environment 115. In this way, the application 125 can continue to run (e.g., the host instructions 110 of the application 125 can continue to run) even while guest instructions are dynamically updated and/or replaced on-the-fly (e.g., in real-time) with updated versions of the guest instructions. In some examples, the guest environment 115 includes a virtual machine to run the guest instructions within, to further separate the guest instructions from the host instructions 110 of the application 125 and improve security. In some examples, the guest environment 115 includes an OS-level virtualization container to run the guest instructions within, to separate the guest instructions from the host instructions 110 of the application 125 and improve security. In some examples, the host instructions 110 are referred to as host code. In some examples, the guest instructions (e.g., the guest instructions 140 and/or customized guest instructions 145) are referred to as guest code.

The management system 105 can publish a version of the application 125 (e.g., including the host instructions 110 with the guest environment 115) to an app repository 117. In some examples, the app repository 117 can be a platform-specific app repository, such as the App Store® for iOS®, the Google® Play® Store for Android®, or another platform-specific app repository. The app repository 117 can be a platform-agnostic app repository and/or multi-platform app repository, such as a web-based app repository (e.g., GitHub®) or a multi-platform app store (e.g., Steam® store). An example interface of the app repository 117 illustrates "Home Application" and "Car Application" as two example applications that the client device 120 can obtain from the app repository 117.

The client device 120 retrieves a version of the application 125 (e.g., including the host instructions 110 with the guest environment 115) from the app repository 117. The client device 120 can be a mobile handset, a smart phone, a wireless communication device, a headset, a handset, a laptop, a wearable device, a portable device, any other type of computing system or device discussed herein, or a combination thereof. For instance, the user 130 can open a portal to the app repository 117 on the client device 120 to download or otherwise retrieve the version of the application 125 (e.g., including the host instructions 110 with the guest environment 115) from the app repository 117. In some examples, the user 130 can sideload a version of the application 125 downloaded from app repository 117 or otherwise from the Internet, to client device 120 by, e.g., sideloading an IPA (.ipa file) for iOS® or an APK (.apk file) for Android®.

A representation of a partial user interface 150 of the version of the application 125 (e.g., including the host instructions 110 with the guest environment 115) that is retrieved from the app repository 117, without any guest instructions running in the guest environment, is illustrated in FIG. 1 as including certain UI elements (e.g., a heading reading "Home App" with a corresponding icon and a subtitle reading "Home item market") and a blank space representing a portion of the UI to be provided by guest instructions to be executed in the guest environment 115 of the application 125. While the space representing a portion of the UI to be provided by guest instructions to be executed in the guest environment 115 is illustrated as blank, it should be understood that in some cases, the host instructions 110 would provide a user interface in this space, and that the guest instructions would update this user interface.

The management system 105 can generate and/or receive guest instructions 140 for the application 125. The guest instructions 140 can be platform-agnostic, user agnostic, app-agnostic (e.g., able to be incorporated into different applications), and/or device agnostic. For instance, the guest instructions 140 can indicate which user interface elements (e.g., buttons, sliders, toggle switches, radio buttons, checkboxes, text fields, interactive graphs, interactive charts, and the like) should be included in a user interface and the positioning (e.g., relative positioning and/or absolute positioning) of these UI elements, without having to specify particular UI styles, types, colors, animations, layouts, arrangements, orientations, sizes, and/or other attributes of the UI. The management system 105 can provide the guest instructions 140 to a customization system 135 that can customize the guest instructions 140 to generate customized guest instructions 145. The customization system 135 can customize the guest instructions 140 based on a platform that the client device 120 uses (e.g., an operating system, firmware, basic input/output system (BIOS), web browser, and/or other software running on the client device 120) so that the customized guest instructions 145 are platform-specific, for instance using platform-specific UI style(s) and/or type(s), and/or using platform-specific features and/or functions.

For instance, the customization system 135 can select from multiple platform-specific UI style(s) and/or type(s), such as the example UI style(s) and/or type(s) illustrated as "Platform A" and "Platform B," respectively, in FIG. 1. Non-limiting examples of differences in UI styles or types are illustrated between Platform A and Platform B as illustrated in FIG. 1. For instance, in the illustrative example of FIG. 1, Platform A uses a UI style or type that includes UI elements that generally have more rounded edges, while Platform B uses a UI style or type that includes UI elements that generally have more angular edges. For instance, buttons, checkboxes, toggle switches, and text fields have rounded edges under the UI style or type of Platform A, but have angular edges under the UI style or type of Platform B. Buttons have a single-line border under the UI style or type of Platform A, while buttons have a double-line border under the UI style or type of Platform B. Checkmarks extend outside of checkboxes under the UI style or type of Platform A, while checkmarks are fully contained within checkboxes under the UI style or type of Platform B. The backgrounds behind toggle switches have different shading under the UI style or type of Platform A than they do under the UI style or type of Platform B. Text fields are white and left-aligned under the UI style or type of Platform A, while text fields are shaded and center-aligned under the UI style or type of Platform B.

In the illustrative example of FIG. 1, the client device 120 uses Platform A. A non-limiting example of a user interface 155 of the application 125 with the customized guest instructions 145 is illustrated in FIG. 1. The customized guest instructions 145 includes UI elements with the style and type indicated for Platform A, indicating that the client device 120 uses Platform A. The UI 155 identifies a "fancy door" as being for sale for $100, with a toggle switch identifying whether to include a security bolt (for an extra $25), with checkboxes to select a color (e.g., between red and blue), with a text field to identify text to print on the door (e.g., "Welcome"), and with a "Add to Cart" button to purchasing the door and any other items otherwise identified for purchase (e.g., already added to the cart).

In an illustrative example, the guest instructions 140 can identify the button, toggle switch, checkboxes, text field, and button to be included in the UI 155, and can identify positions of these elements relative to one another and/or in the UI 155. Based on the client device 120 using Platform A, the customization system 135 can specify that the UI 155 is to configure these UI elements to match the UI style and type of Platform A (e.g., with the rounded edges and other attributes specific to Platform A as described above) in the customized guest instructions 145 sent to the client device 120 and run in the guest environment 115 in the application 125 on the client device 120. For a second client device (other than the client device 120) that uses Platform B, the customization system 135 can specify that the UI 155 is to configure these UI elements to match the UI style and type of Platform B instead (e.g., with the angular edges and other attributes specific to Platform B as described above) in the separate set of customized guest instructions sent to the second client device and run in the guest environment 115 in the application 125 on the second client device. That is, the management system 105 can create and/or receive a single set of guest instructions 140 that can be interpreted and/or customized by the customization system 135 such that the resulting output is customized or otherwise specific to a particular characteristic (e.g., platform, device, etc.) without the management system 105 needing to create and/or receive multiple, different sets of guest instructions that correspond to the particular characteristic.

In some examples, the management system 105 provides the application 125 (including host instructions 110 as well as the guest environment 115) to the client device 120 through the app repository 117. The application 125 can receive guest instructions (e.g., guest instructions 140 or customized guest instructions 145) from a server (e.g., of the customization system 135 and/or the management system 105) after the application 125 is already installed on the client device 120 (e.g., and in some cases while the application 125 is running on the client device 120), and can run the guest instructions through an interpreter within the guest environment 115 of the application 125. The interpreter can interpret the guest instructions at runtime. An active design system of the customization system 135 can tailor UI elements of the guest code to match the native UI style for the platform (e.g., operating system, web browser, firmware, BIOS, and the like) of the client device 120 that the application 125 is running on. The native UI styles or types can include native styles for various UI elements or UI components, and in some examples can include native UI elements or UI components that might not be available for other platforms. The guest environment 115 allows respective functions of the host instructions 110 and the guest instructions to pass values between one another, bridging the host instructions 110 and the guest instructions without sharing any memory between the two (e.g., the guest environment has a guest memory that is separate from a host memory corresponding to the host instructions 110). In some examples, the guest instructions can use JavaScript, WebAssembly, Kotlin, or another language. In some examples, the host instructions 110 and the guest instructions use the same language.

In some examples, the customization system 135 can generate or convert the guest instructions 140 from one language or format into another language or format to generate the customized guest instructions 145. In some examples, the customization system 135 can convert UI element(s) indicated in the guest instructions 140, or provided with the guest instructions 140, from one language or format into another language or format (e.g., via generation of the guest instructions 140 in the other language or format), which can then be used to generate the customized guest instructions 145. For instance, in an illustrative example, the customization system 135 can convert guest instructions 140 associated with or otherwise indicating a user interface that is provided in one format (e.g., a format associated with an interface design tool such as Figma®) and convert the user interface into another format (e.g., a format that is usable by a specific platform such as Android® Compose and/or iOS® Swift UI code) to generate the customized guest instructions 145. In some examples, the guest instructions 140 in the first format can be provided with a prompt to convert or generate the guest instructions 140 in another format. In some examples, such a conversion can be accomplished by the generation of new instructions in the other format, for example, using generative artificial intelligence or other models, as described below.

In some examples, the customization system 135 can interface with an artificial intelligence (AI) engine 137 for generation of customized user interfaces and/or conversion of user interfaces from one format to another, such as from a format associated with an interface design tool to a format that is usable by a specific platform. In some examples, the AI engine 137 may be trained for generative artificial intelligence (AI) functions. In some examples, the AI engine 137 includes one or more trained machine learning models. For instance, in some examples, the AI engine 137 includes one or more large language models (LLMs) such as a Generative Pre-Trained Transformer (GPT) (e.g., GPT-2, GPT-3, GPT-3.5, GPT-4, etc.), DaVinci, an LLM using LangChain (MIT), or a combination thereof. In some examples, the AI engine 137 can include one or more neural network (NNs), one or more convolutional neural networks (CNNs), one or more trained time delay neural networks (TDNNs), one or more deep networks, one or more auto-encoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, one or more LLMs, or combinations thereof.

Within FIG. 1, a graphic representing a trained ML model of the AI engine 137 illustrates a set of circles connected to another. Each of the circles can represent a node, a neuron, a perceptron, a layer, a portion thereof, or a combination thereof. The circles are arranged in columns. The leftmost column of white circles represents an input layer. The rightmost column of white circles represents an output layer. Two columns of shaded circles between the leftmost column of white circles and the rightmost column of white circles each represent hidden layers. The lines between nodes can represent weights between nodes, established during training of the trained ML model(s) of the AI engine 137 and updated (e.g., fine-tuned) based on feedback to content that the trained ML model(s) of the AI engine 137 generate.

In some examples, the customization system 135 can use the AI engine 137 for additional purposes. For instance, in some examples, the customization system 135 can use the AI engine 137 to generate a new UI style or new UI type for an additional platform, for instance given an input of example UIs in the additional platform. In this way, the customization system 135 can quickly adapt to new platforms, even new platforms that do not have well-documented UI styles.

The pushing of guest instructions (e.g., customized as the customized guest instructions 145) to the application 125 (e.g., from the customization system 135) provides the above-described benefits of both local functions and remote functions without the downsides of either local functions or remote functions. The guest instructions can be pushed to the client device 120 without requiring an update to the entire application 125, and thus can be updated periodically (to keep it up to date) without needing network access or adding latency delays at runtime, and running as quickly as the host instructions 110, which are local to the application 125. As a result, reliable and consistent operation of the application 125 with reliably up-to-date and secure code for interfaces and/or other aspects of the application 125 is enabled. Running the guest instructions without sharing memory with the host instructions 110 can serve as a security precaution to help protect the host instructions, and can allow the guest instructions to be updated on-the-fly as the application 125 is running (e.g., using the host instructions 110). In some examples, to avoid sharing memory between the host instructions 110 and the guest instructions, the application 125 (and in particular the guest environment 115) can be designed to avoid sharing a representation object, instead opting for invisible (or visible) encoding and decoding of data transferred between the host instructions 110 and the guest instructions. Additionally, pushing guest instructions to the client device 120 without requiring an update can reduce processing requirements on the client device 120. In particular, CPU clock cycles, memory usage and other associated resources involved in the installation of the application 125 by the client device 120 can be avoided. Further, bandwidth usage of the network can also be reduced by the pushing of guest instructions instead of performing a full update to the entire application 125.

In some examples, certain changes in UI between different platforms are deliberate, for instance based on divergences in how certain components look or function on certain platforms. For example, the 'share' icons on iOS and Android are different from each other, but consistent across different applications within each platform. Similarly, scroll physics are significantly different between these two platforms. In some examples, the customization system 100 can track such deliberate changes or differences to make it easy to confirm whether a difference between platforms is deliberate or not. In an illustrative example, a change list subsystem in the customization system 100 captures a user interface symbolically, including the view hierarchy, and the properties of each item. The same UI is rendered on each host platform to a screenshot image in the change list subsystem, and differences are verified (e.g., manually or automatically) as deliberate. This change list subsystem can be used as a source of truth to compare against to detect features that are inadvertently different and should be corrected (e.g., one platform interprets 'emphasis=true' as bold and another platform interprets 'emphasis=true' as italic).

In some examples, a challenge in the customization system 100 is that the customized guest instructions 145 and the host instructions 110 do not share memory, and they do not use a common in-memory representation of values or data. For method calling, rather than having a caller pass a value to a receiver by sending its memory address, in the customization system 100, pass-by-value can be combined with pass-by-reference. One significant benefit of this approach is that guest instructions can be cleanly and completely unloaded at any time (e.g., when they are no longer needed, when they are to be updated, when an error or exception is thrown, when a security vulnerability is found, another reason, or some combination thereof).

In some examples, at least a subset of the functions described herein as being performed by the customization system 135 can instead be performed at the client device 120. For instance, in such examples, a client device 120 can receive the guest instructions 140 that are platform-agnostic, user agnostic, app-agnostic (e.g., able to be incorporated into different applications), and/or device agnostic. The client device 120 can customize the guest instructions to generate the customized guest instructions 145 as discussed above with respect to the customization system 135, including by selecting a native UI type or native UI style based on the platform that the client device 120 uses and/or any conversion, reformatting, or other operations as appropriate. The client device 120 can run the customized guest instructions 145 in the guest environment 115 as discussed previously.

Figure 2:
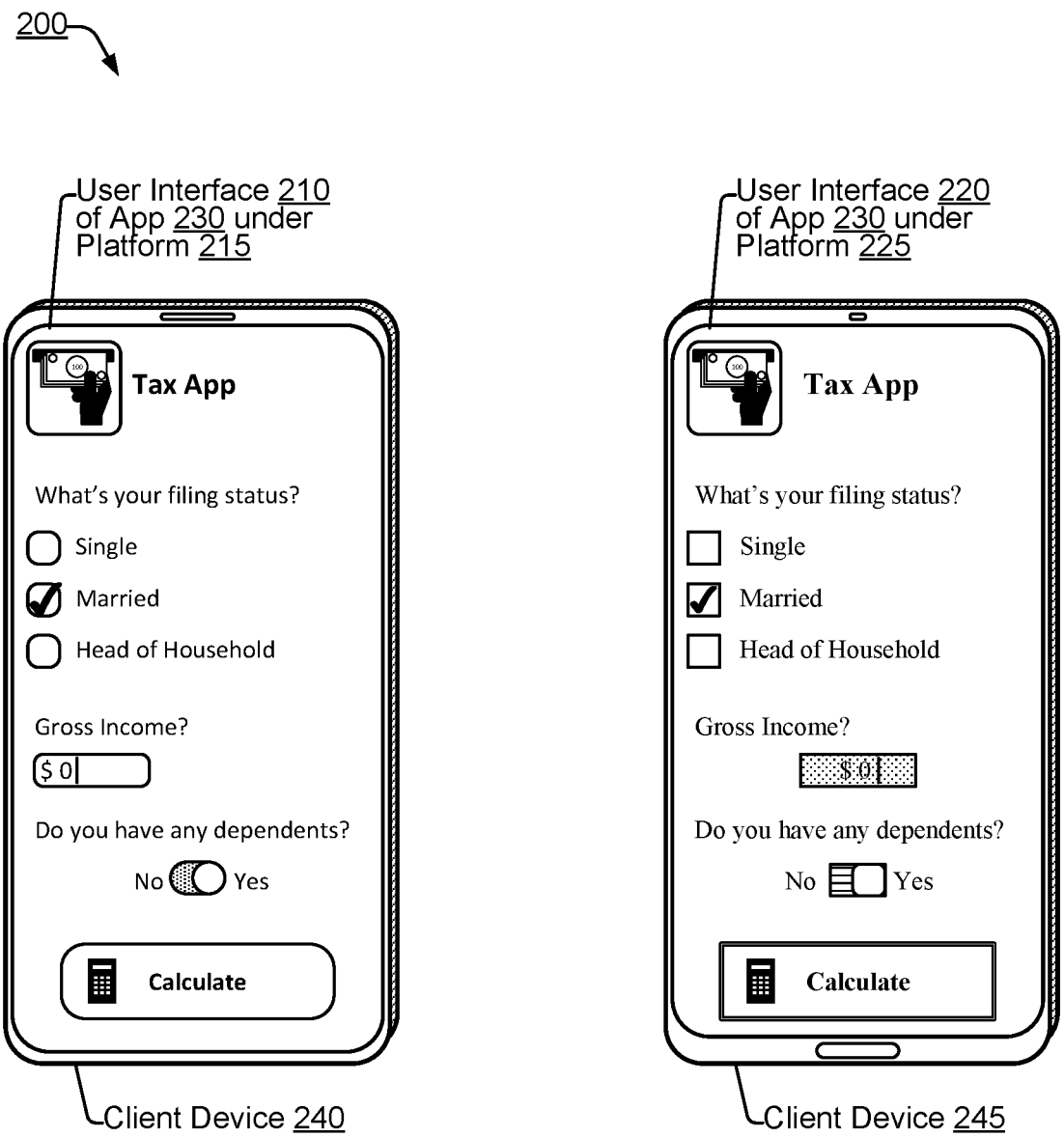
FIG. 2 is a conceptual diagram illustrating examples of user interfaces for an application that are customized for different platforms, in accordance with some examples.

FIG. 2 is a conceptual diagram 200 illustrating examples of user interfaces (e.g., user interface 210 and user interface 220) for an application 230 that are customized for different platforms (e.g., platform 215 and platform 225). The application 230 can be an example of the application 125 of FIG. 1. In FIG. 2, the application 230 is a tax application that asks the user for information for filing the user's taxes. The user interface 210 and the user interface 220 both include the same UI elements in the same general positions, specifically a set of checkboxes (for selecting marital status), a text field (for inputting gross income), and a toggle switch (asking whether or not the user has any dependents). The user interface 210 of the application 230 represents a user interface with customized guest instructions (e.g., customized guest instructions 145) customized for the platform 215 and/or the client device 240 using the platform 215, with has some of the same UI styles and types illustrated as being associated with Platform A in FIG. 1, for instance including the rounded edges and left-aligned text fields. The user interface 220 of the application 230 represents a user interface with customized guest instructions (e.g., customized guest instructions 145) customized for the platform 225 and/or the client device 245 using the platform 225, with has some of the same UI styles and types illustrated as being associated with Platform B in FIG. 1, for instance including the angular edges and center-aligned text fields. The client device 240 and the client device 245 are examples of the client device 120.

Figure 3:
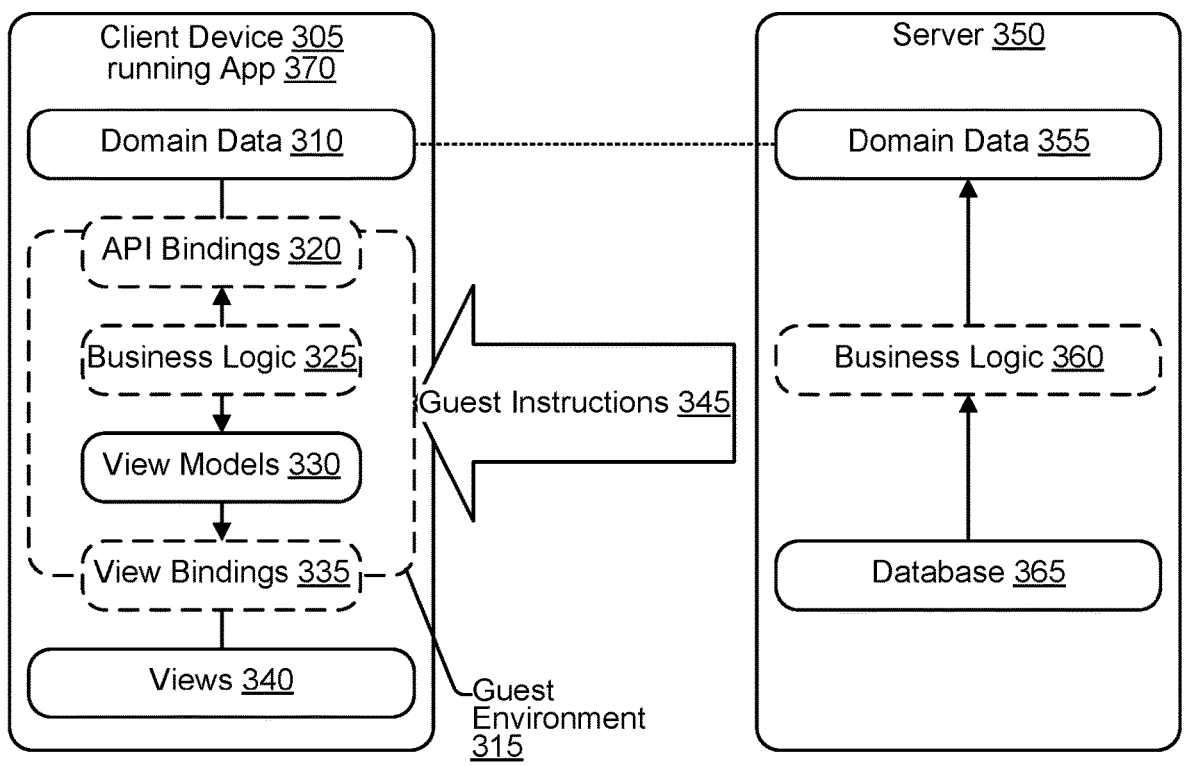
FIG. 3 is a block diagram illustrating a client device that is configured to run guest instructions in a guest environment and that is configured to communicate with a server, in accordance with some examples.

FIG. 3 is a block diagram 300 illustrating a client device 305 that is configured to run guest instructions 345 in a guest environment 315 and that is configured to communicate with a server 350. The client device 305 can be an example of the client device 120. The client device 305 is running an application 370 that is an example of the application 125. The application 370 running on the client device 305 includes host instructions 110 including domain data 310, a guest environment 315, and/or views 340. The server 350 includes corresponding domain data 355. In some examples, the domain data 310 and/or the domain data 355 include logic, such as business logic 325, business logic 360, and/or various algorithms, methods, and/or functions used by the application running on the client device 305. In some examples, the domain data 310 and the domain data 355 refer to an application layer of the application 370 with logic, algorithms, and functions, along with the analogous logic, algorithms, and functions on the server 350 side. The host instructions 110 of the application 370 incudes a guest environment 315 that couples to the domain data 310 of the host instructions 110 using application programming interface (API) bindings 320, which for instance can be used for API bridging to generate a bridge (e.g., bridge 530) between the host instructions 110 (e.g., the domain data 310) and guest instructions 345 being run in the guest environment 315. The guest instructions 345 can be communicated to the client device 305 from the server 350. The guest instructions 345 can be an example of the customized guest instructions 145. The server 350 can be an example of the customization system 135, the management system 105, the app repository 117, or a combination thereof. The guest environment 315 is an example of the guest environment 115. In some examples, the guest environment 315 can be referred to as a dynamic client.

The guest instructions 345 can include business logic 325, for instance indicating rules identifying how the application makes certain decisions. The business logic 325 can be based on corresponding business logic 360 in the server 350. In some examples, the business logic can be referred to as algorithmic logic, logic, algorithms, calculations, formulas, equations, rules, or a combination thereof. The guest instructions 345 can identify view models 330 that can map, using view bindings 335, to actual views 340 that are output via a display screen of the client device 305. The views 340 represent what is displayed on the screen of the client device 305, and can be influenced by the host instructions 110, the guest instructions 345, or a combination thereof. The view models 330 and/or view bindings 335 can include instructions to the client device 305 on what UI elements to draw where, and what styles to use, and the like. The server 350 can also include, or otherwise have access to (e.g., over a network), at least one database 365. The database 365 can provide persistence in data, rules, instructions, business logic 360, domain data 355, or combinations thereof.

In some examples, the application 370 can support synchronous functions and/or asynchronous functions between functions in the host instructions 110 and functions in the guest instructions 345. For asynchronous functions, a calling convention can be used wherein outbound calls from a transmitting device to a receiving device (e.g., from the client device 305 to the server 350 or vice versa) generate a unique callback identifier (ID), and the unique callback ID is sent from the transmitting device to the receiving device. In some examples, the receiving device may return a result to the transmitting device immediately, representing a synchronous response. In some examples, the receiving device may instead return a 'still processing' response, and then deliver a results back to the transmitting device later (in association with the callback ID so it is clear which call is being responded to), representing an asynchronous response. The 'still processing' response can include another generated ID that the transmitting device can use (in addition to or instead of the callback ID for the initial call) to cancel the call to the receiving device if the function call is no longer needed by the transmitting device.

In some examples, the application 125 can support rich failure traces for exceptions in the host instructions 110 and/or exceptions in the guest instructions 345. For traces, a mechanism can be used to unify exception traces between an execution engine (e.g., using JavaScript) and a calling platform (e.g., Java Virtual Machine (JVM) or native). To support an additional language (e.g., Kotlin) in the execution engine (e.g., using JavaScript), call traces can implement a build-time bytecode transformation process where JavaScript debug information (e.g., file names and line numbers) is mapped dynamically to the corresponding debug information in the additional language (e.g., Kotlin). This mapping for these exception traces can use JavaScript source maps.

A technical benefit of the system that includes the client device 305 and the server 350 is offline support. That is, the client device 305 can continue to run the application 370 even when the client device 305 does not have network access, since the client device 305 has received the guest instructions 345 from the server 350 and can execute the guest instructions 345 locally, not needing to be regularly communicating with the server 350 to do so. In some examples, offline support includes using the most recently available guest instructions 345 if fresh guest instructions 345 cannot be downloaded due to lack of network connectivity or any other issue with the network connection between the client device 305 and the server 350. In some examples, the client device 305 and/or the application 370 can be configured to display an "offline" indicator (e.g., icon, banner) to notify the user of the client device 305 that the guest instructions 345 being run may be slightly out of date. In some examples, the client device 305 and/or the application 370 can be configured to include an expiration time threshold for guest instructions 345. For instance, if the client device 305 has not been able to confirm with the server 350 whether the guest instructions 345 are up-to-date for longer than the expiration time threshold, the client device 305 and/or the application 370 can invalidate the guest instructions 345, unload the guest instructions 345, and/or delete the guest instructions 345. This can prevent a system from running out-of-date instructions for an extended period of time, intentionally or otherwise, due to lack of network connection between the client device 305 and the server 350.

In some examples, selecting and using native UI elements or components, or associated native UI styles and/or types, as in the customization system 135, provides the customization system 100 with several benefits. These benefits include the ability to migrate behavior from the server 350 to the client device 305, and/or from the host instructions 110 to the guest instructions 345, without UI changes other than those intended for native UI styles and types. Another benefit includes reduced technical risk, in that native UI components render data for the user without concern as to whether the host instructions 110 or the guest instructions 345 are driving a specific UI element. By changing only the logic, fewer things that can go wrong at launch and/or during transition. Another benefit includes simplifying animations. For example, a button can be animated between the host instructions 110 and the guest instructions 345 without concern for how the button was configured. Another benefit includes sharing behavior and features between the host instructions 110 and the guest instructions 345. Features like image caching, dark mode, typography customization, variable DPI, and accessibility are consistent because of the common (native) UI system in use by both the host instructions 110 and the guest instructions 345.

Figure 4:
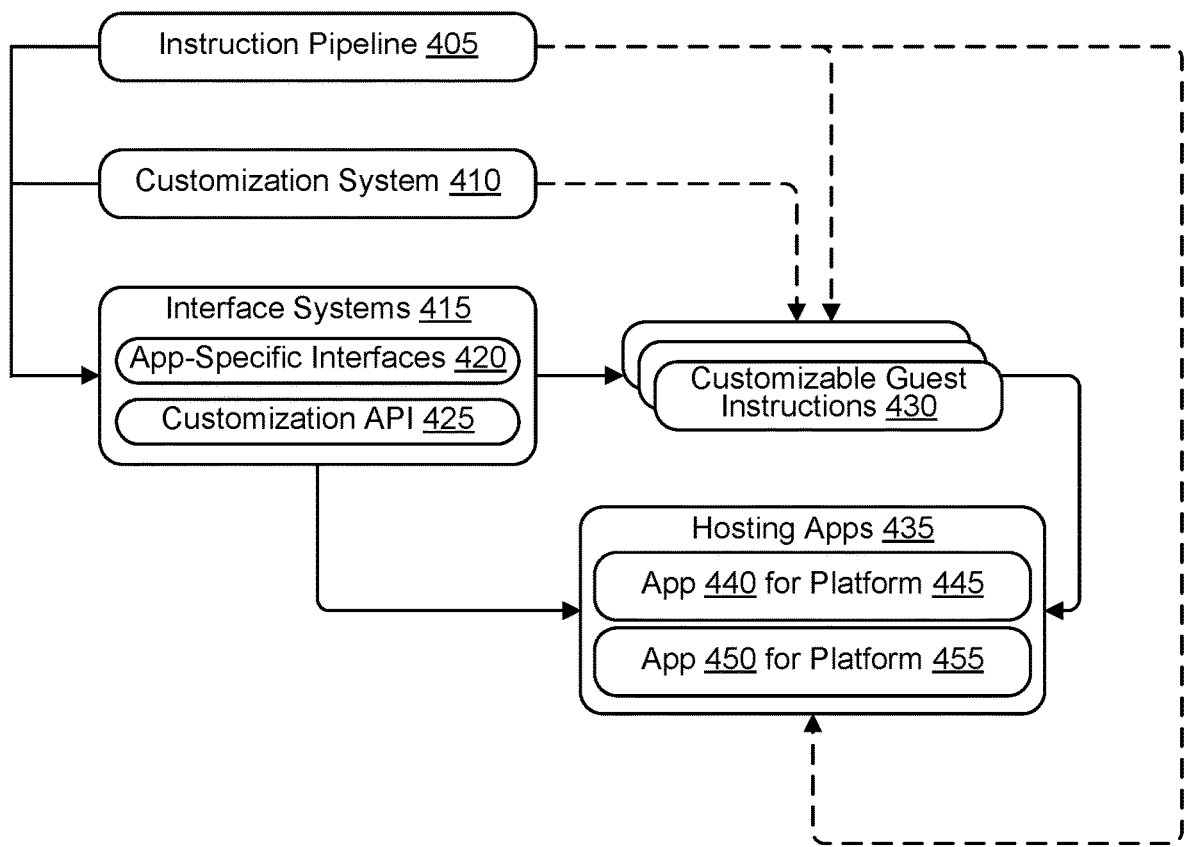
FIG. 4 is a block diagram illustrating an architecture of an application interface customization system that customizes an application's user interface(s) based on application specific interfaces and different platforms, in accordance with some examples.

FIG. 4 is a block diagram illustrating an architecture of an application interface customization system 400 that customizes an application's user interface(s) based on application specific interfaces 420 and different platforms (e.g., platform 445 and platform 455). The application interface customization system 400 includes an instruction pipeline 405 can include one or more channels for getting instructions from the management system 105 to the client device 120, for instance including a first channel through the app repository 117 for delivering the host instructions 110 (e.g., with the guest environment 115) to the client device, and including a second channel through the customization system 135 for customizing guest instructions 140 to deliver customized guest instructions 145 to the client device 120. The application interface customization system 400 includes a customization system 410 that can, for instance, include the customization system 135 for customizing guest instructions 140 to generate customized guest instructions 145 that are customized for a given platform, user, and/or device. The application interface customization system 400 includes interface systems 415 that include app-specific interfaces 420 and a customization API 425. The app-specific interfaces 420 can, for instance, indicate a style or scheme specific to the app, for instance a color scheme, a set of icons or animations to use, a size and/or orientation of certain UI element(s), a layout and/or arrangement of one or more UI elements relative to one another and/or to the display, and the like, so that even when the customization system 410 customizes the guest instructions 140, the customized guest instructions 145 still recognizably belongs to the app (e.g., by using the correct color scheme and other app-specific attributes indicated by the app-specific interfaces 420). The customization APIs 425 can allow the customized guest instructions 145 to interface with the host instructions 110, for instance using abridge (e.g., bridge 530).

The interface systems 415, in combination with the customization system 410 and/or the instruction pipeline 405, can provide customizable guest instructions 430 that are customized for different platforms, devices, and/or users. The customizable guest instructions 430 are provided to hosting applications 435 with guest environments 115. The hosting applications 435 include, for example, a first application 440 for a first platform 445 and a second application 450 for a second platform 455. The hosting applications 435 are examples of the application 125, and in particular of the host instructions 110 and guest environment 115 of the application 125. The customizable guest instructions 430 are examples of the customized guest instructions 145.

Figure 5:
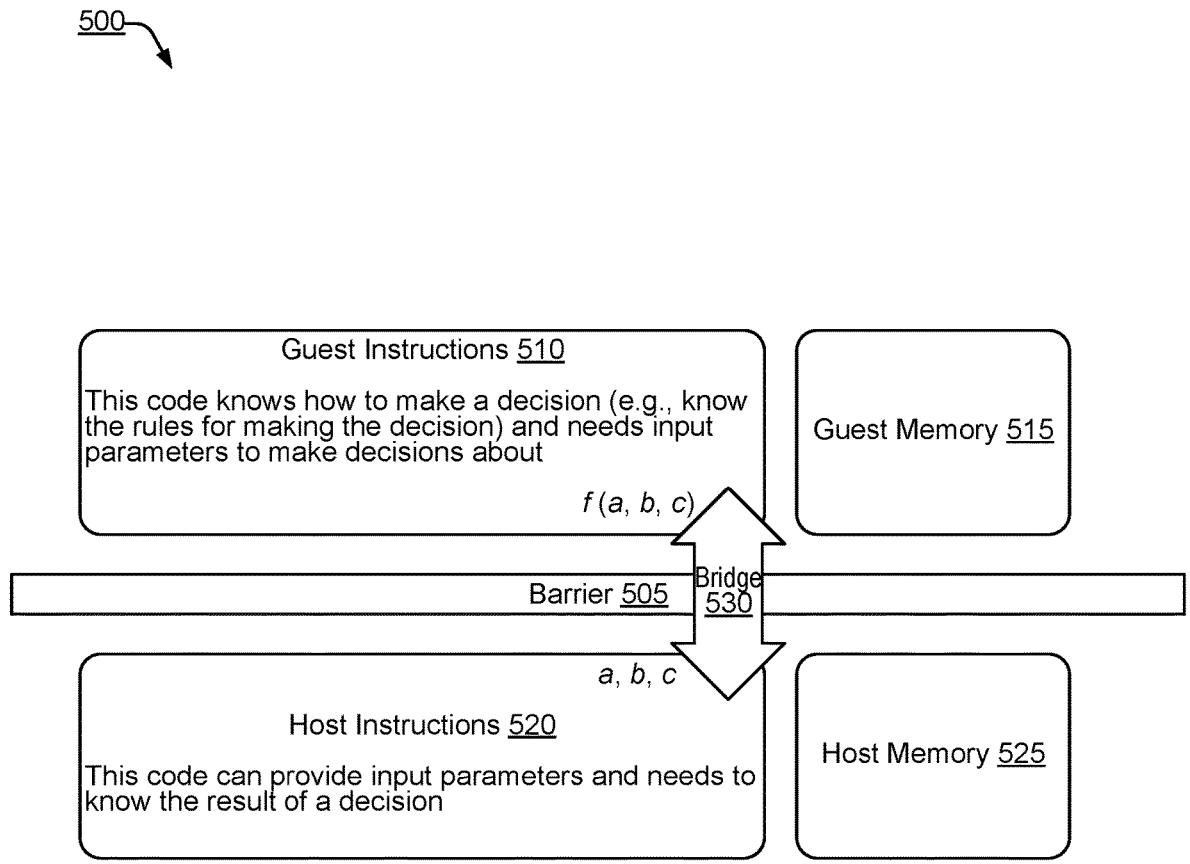
FIG. 5 is a block diagram illustrating an application interface bridging system that forms a bridge between guest instructions and host instructions, in accordance with some examples.

FIG. 5 is a block diagram illustrating an application interface bridging system 500 that forms a bridge 530 between guest instructions 510 and host instructions 520.

The guest instructions 510 are examples of the customized guest instructions 145. The host instructions 520 are examples of the host instructions 110. According to the application interface bridging system 500, the guest instructions 510 use a guest memory 515 that is separate from a host memory 525 that is used by the host instructions 520. A barrier 505 between the guest instructions 510 and the host instructions 520 represents limited interaction capability between the guest instructions 510 and the host instructions 520. The barrier 505 extends between the guest memory 515 and the host memory 525, indicating no shared memory between the guest instructions 510 and the host instructions 520. The barrier 505 can be a representation of limitations, rules, and/or functional separation (e.g., via a virtual machine and/or OS-level virtualization container) set in place by the guest environment 115. The guest instructions 510 include code that knows how to make a decision (e.g., know the rules for making the decision) and needs input parameters to make decisions about. The host instructions 520 can provide input parameters and needs to know the result of a decision. In an illustrative example indicated in FIG. 5, the host instructions 520 can provide input parameters (indicated as a, b, and c) to a function $f(\ )$ in the guest instructions 510 using a bridge 530 across the barrier 505, the bridge 530 for instance implemented using the customization APIs 425. The input parameters from the host instructions 520 are thus passed to the function in the guest instructions 510 to produce a result from the input parameters entered into the function as such: $f(a, b, c)$. This can be referred to as a pass-by-value bridge 530. The barrier 505 can also be referred to as a boundary. In some examples, the input parameters (indicated as a, b, and c) can be encoded (e.g., encrypted and/or compressed) on the host instructions 520 side before being passed over the bridge 530 to the guest instructions 510, and can be decoded (e.g., decrypted and/or decompressed) on the guest instructions 510 side before being input into the function $f(a, b, c)$ on the guest instructions 510 side. Encryption over the bridge 530 can improve security. Compression over the bridge 530 can reduce the amount of bandwidth usage over the bridge 530, which in some cases can have a physical aspect (e.g., if the host instructions 520 and guest instructions 510 are executed by different processors or cores). In some examples, the opposite order can occur, with input parameters passing from the guest instructions 510 over the bridge 530 to be input into a function in the host instructions 520.

Figure 6:
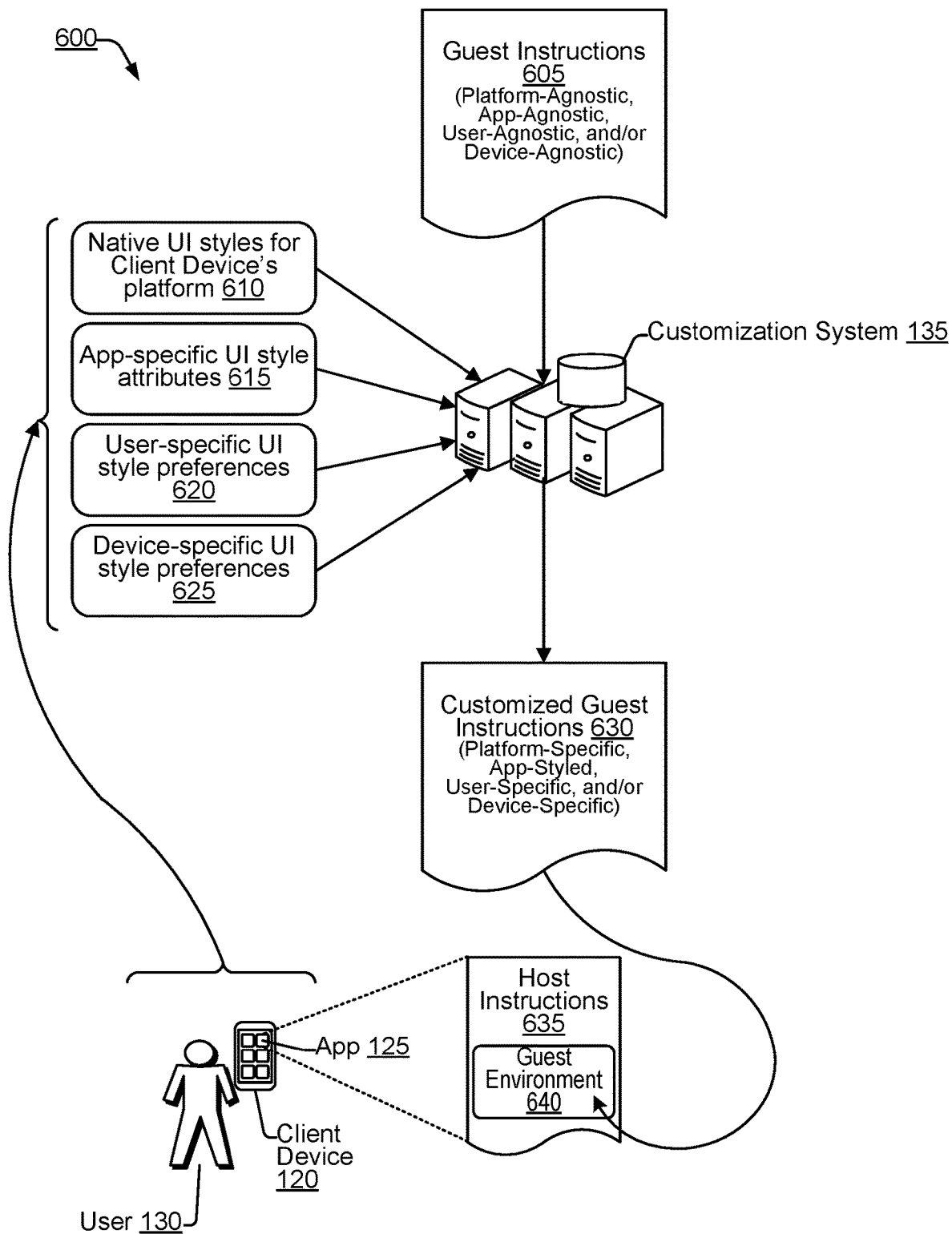
FIG. 6 is a block diagram illustrating an application interface customization system that customizes guest instructions to generate customized guest instructions based on a combinations of UI styles, UI attributes, and/or UI preferences specific to the platform, the app, the user, and/or the client device, in accordance with some examples.

FIG. 6 is a block diagram illustrating an application interface customization system 600 that customizes guest instructions 605 to generate customized guest instructions 630 based on a combinations of UI styles, UI attributes, and/or UI preferences specific to the platform (e.g., that the client device 120 runs the application 125 through), the application 125, the user 130, and/or the client device 120. The guest instructions 605 are an example of the guest instructions 140, and can be platform-agnostic, app-agnostic (e.g., able to be used in multiple different types of apps), user-agnostic, and/or device-agnostic. The customization system 135 receives the guest instructions 605, for instance from the management system 105. The customization system 135 customizes the guest instructions 605 based on several factors to produce customized guest instructions 630.

The factors include native UI styles for the platform 610 used by the client device 120, such as native UI styles for an operating system, web browser, firmware, BIOS, or other software platform used by the client device 120. The factors include app-specific UI style attributes 615, such as color schemes, patterns, icons, logos, and/or other attributes specific to the app (e.g., as in the app-specific interfaces 420). The factors include user-specific UI style preferences 620 of the user 130, for instance to provide larger fonts to accommodate a vision impairment of the user 130, to provide a specific font that the user 130 likes, to use a "dark mode" or a "light mode" or other theme choice that the user 130 prefers, or the like. The factors include device-specific UI style preferences 625, for instance concerning how to best fit certain UI elements onto the screen of the client device 120 given the resolution of the display (e.g., which may be small if the client device 120 is a wearable device, a headset, or another portable device), any color limitations of the display (e.g., black and white as in an e-paper or e-ink display, limited color range, etc.), an arrangement of the display (e.g., portrait, landscape), a shape of the display (rectangular, square, rounded rectangle, rounded square, circular, or another shape), or a combination thereof. Thus, the customized guest instructions 630 can be platform-specific, app-specific (app-styled), user-specific, and/or device-specific. The customized guest instructions 630 can be run in the guest environment 640 of the host instructions 635 of the application 125 on the client device 120 of the user 130. The customized guest instructions 630 can be an example of the customized guest instructions 145. The host instructions 635 can be an example of the host instructions 110. The guest environment 640 can be an example of the guest environment 115.

Figure 7A:
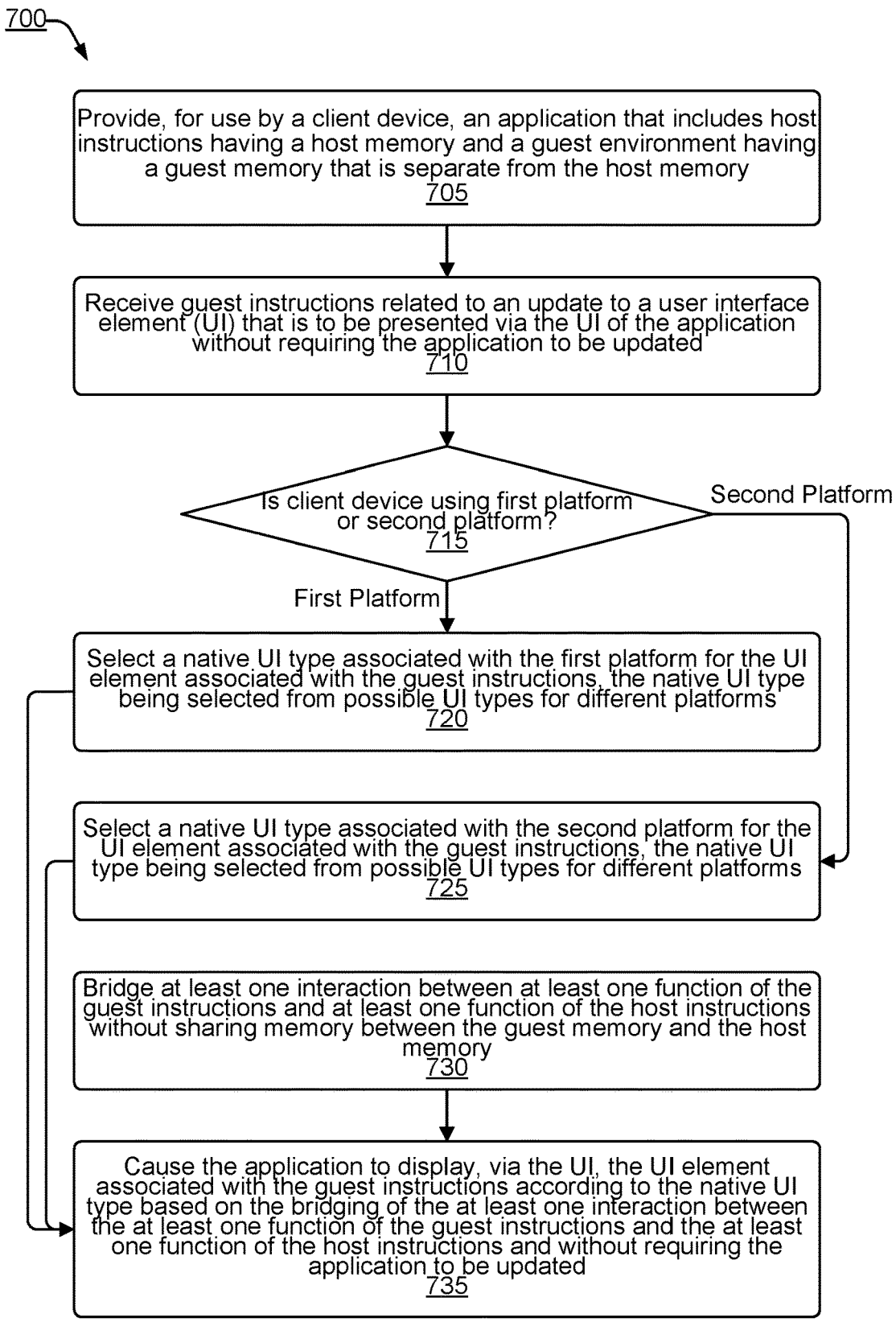
FIG. 7A is a flow diagram illustrating a process for updating a user interface of an application without requiring the application to be updated, in accordance with some examples.

FIG. 7A is a flow diagram illustrating a process 700 for updating a user interface of an application without requiring the application to be updated. The process 700 can be performed by, and/or using, an application customization system. The application customization system can include, for instance, the application interface customization system 100, the management system 105, the app repository 117, the client device 120, the customization system 135, the client device 240, the client device 245, the client device 305, the server 350, the application interface customization system 400, the instruction pipeline 405, the customization system 410, the interface systems 415, the app-specific interfaces 420, the customization API 425, the customizable guest instructions 430, the hosting applications 435, the application interface bridging system 500, the barrier 505, the guest instructions 510, the guest memory 515, the host instructions 520, the host memory 525, the bridge 530, the application interface customization system 600, an application customization system for performing the process 750, the environment 800 for application interface customization, the environment 900, the system 1000, any subsystems or components of any of the above-listed systems, any other computing systems discussed herein, or a combination thereof.

The process 700 can be for updating a user interface (UI) of an application without requiring the application to be updated. At operation 705, the application customization system (or a subsystem thereof) is configured to, and can, provide the application (e.g., application 125) for use by a client device (e.g., client device 120), the application including host instructions (e.g., host instructions 110) having a host memory (e.g., host memory 525) and a guest environment (e.g., guest environment 115) having a guest memory (e.g., guest memory 515) that is separate from the host memory (e.g., separated by the barrier 505).

At operation 710, the application customization system (or a subsystem thereof) is configured to, and can, receive guest instructions (e.g., guest instructions 140) after providing the application, the guest instructions relating to an update to at least one user interface element that is to be presented via the user interface (e.g., Partial UI 150, UI 155) of the application without requiring the application to be updated.

At operation 715, the application customization system (or a subsystem thereof) is configured to, and can, determine whether the client device is using a first platform or a second platform (e.g., Platform A or Platform B, platform 215 or platform 225, platform 445 or platform 455). If the application customization system determines that the client device is using the first platform, then operation 715 is followed by operation 720. If the application customization system determines that the client device is using the second platform, then operation 715 is followed by operation 725.

At operation 720, the application customization system (or a subsystem thereof) is configured to, and can, select a native user interface type associated with the first platform for the at least one user interface element associated with the guest instructions, the native user interface type being selected from a plurality of possible user interface types corresponding to different platforms. In some examples, the plurality of different platforms include a plurality of different operating systems, and the platform used by the client device is an operating system used by the client device. In some examples, wherein the plurality of different platforms includes a web page configured for viewing using a web browser.

At operation 725, the application customization system (or a subsystem thereof) is configured to, and can, select a native user interface type associated with the second platform for the at least one user interface element associated with the guest instructions, the native user interface type being selected from a plurality of possible user interface types corresponding to different platforms.

At operation 730, the application customization system (or a subsystem thereof) is configured to, and can, bridge (e.g., using a bridge 530) at least one interaction between at least one function to be executed as part of the guest instructions (e.g., $f(\ )$ of the guest instructions 510) and at least one function to be executed as part of the host instructions (e.g., a function that produces parameters a, b, and c of host instructions 520) without sharing memory between the guest memory and the host memory (e.g., maintaining the barrier 505). In some examples, the bridging of the at least one interaction includes receiving at least one value (e.g., a, b, and c in FIG. 5) as an output of the at least one function of the host instructions, and providing the at least one value as an input to the at least one function (e.g., $f(\ )$ in FIG. 5) of the guest instructions.

At operation 730, the application customization system (or a subsystem thereof) is configured to, and can, cause the application to display, via the user interface, the at least one user interface element associated with the guest instructions according to the native user interface type based on the bridging of the at least one interaction between the at least one function of the guest instructions and the at least one function of the host instructions and without requiring the application to be updated.

In some examples, the application customization system (or a subsystem thereof) is configured to, and can, identify an application-specific user interface attribute that is specific to the application. The application customization system (or a subsystem thereof) can combine the native user interface type with the application-specific user interface attribute to generate a combined user interface type. In some examples, causing the application to display the at least one user interface element according to the native user interface type (as in operation 730) includes causing the application to display the at least one user interface element according to the combined user interface type.

In some examples, the guest instructions include executable code with specific logic, not just markup or other UI notations. In some examples, the application and/or the host instructions are not a browser and do not include a browser, and the guest instructions are not a web page and do not include a web page. Rather, the application, the host instructions, and the guest instructions are all configured to run natively on the client device.

In some examples, the application customization system that performs the process 700 includes the customization system 135 as discussed with respect to FIG. 1, for instance with the guest instructions of operation 710 representing the guest instructions 140, with selection of the native UI type in operations 720 and 725 and the bridging of the at least one interaction in operation 730 representing generation of the customized guest instructions 145, and with operation 735 representing causing the client device 120 to run the customized guest instructions 145 in the guest environment 115. In this way, the customization system 135 can perform at least operations 710, 715, 720, 725, 730, and/or 735. In some examples, the application customization system that performs the process 700 also includes the management system 105 and/or the application repository 117, for instance with respect to providing the application 125 for use by the client device 120 (e.g., to the client device 120) as in operation 705.

In some examples, the application customization system that performs the process 700 includes the client device 120. For instance, in some examples, at least a subset of the functions described with respect to FIG. 1 as being performed by the customization system 135 can instead be performed at the client device 120. In such examples, the client device 120 can perform at least operations 710, 715, 720, 725, 730, and/or 735. For instance, in such examples, the client device 120 can receive guest instructions in operation 710 that are platform-agnostic, user agnostic, app-agnostic (e.g., able to be incorporated into different applications), and/or device agnostic as in the guest instructions 140 of FIG. 1. The client device 120 can performs operation(s) 715, 720, 725, and/or 730 to customize the guest instructions to generate the customized guest instructions 145, and can run the customized guest instructions 145 in operation 735. In some examples, a subsystem of the client device 120 (e.g., a network receiver) can perform operation 705, for instance by receiving the application over a network (e.g., from the management system 105 and/or the application repository 117) and providing the application to another subsystem (e.g., the processor) of the client device 120. In some examples, the application customization system that performs the process 700 also includes the management system 105 and/or the application repository 117, for instance with respect to providing the application 125 for use by the client device 120 as in operation 705.

Figure 7B:
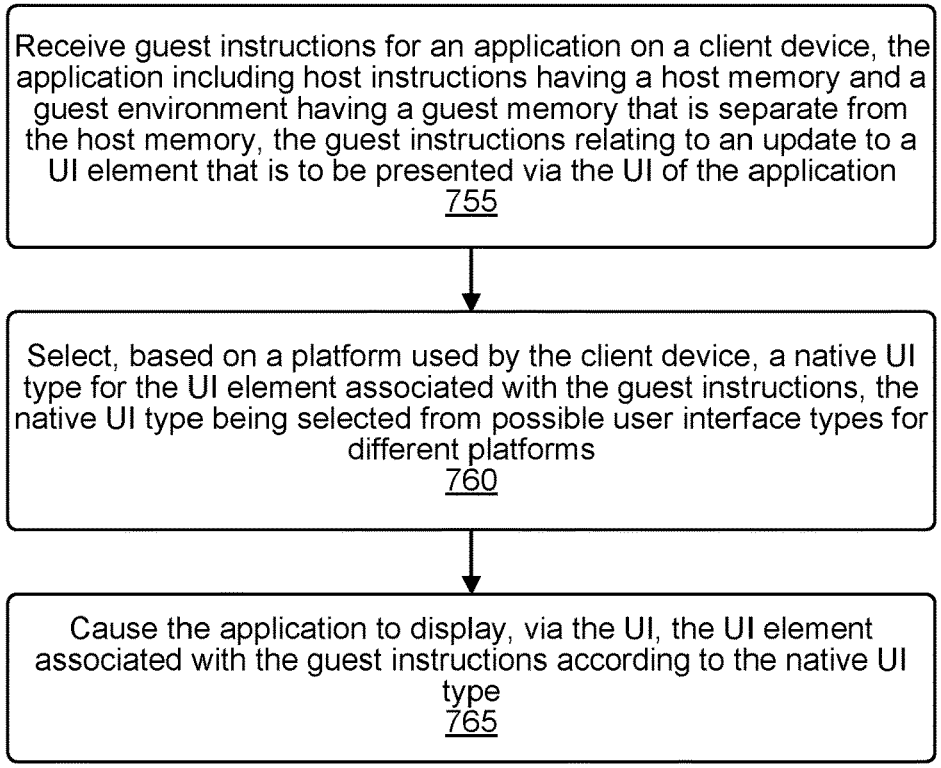
FIG. 7B is a flow diagram illustrating a process for updating a user interface of an application without requiring the application to be updated, in accordance with some examples.

FIG. 7B is a flow diagram illustrating a process 750 for updating a user interface of an application without requiring the application to be updated. The process 750 can be performed by, and/or using, an application customization system. The application customization system can include, for instance, the application interface customization system 100, the management system 105, the app repository 117, the client device 120, the customization system 135, the client device 240, the client device 245, the client device 305, the server 350, the application interface customization system 400, the instruction pipeline 405, the customization system 410, the interface systems 415, the app-specific interfaces 420, the customization API 425, the customizable guest instructions 430, the hosting applications 435, the application interface bridging system 500, the barrier 505, the guest instructions 510, the guest memory 515, the host instructions 520, the host memory 525, the bridge 530, the application interface customization system 600, an application customization system for performing the process 700, the environment 800 for application interface customization, the environment 900, the system 1000, any subsystems or components of any of the above-listed systems, any other computing systems discussed herein, or a combination thereof.

The process 750 can be for updating a user interface of an application without updating the application. At operation 755, the application customization system (or a subsystem thereof) is configured to, and can, receive guest instructions for an application on a client device, the application including host instructions having a host memory and a guest environment having a guest memory that is separate from the host memory, the guest instructions relating to an update to at least one user interface element that is to be presented via the user interface of the application.

At operation 760, the application customization system (or a subsystem thereof) is configured to, and can, select, based on a platform used by the client device, a native user interface type for the at least one user interface element associated with the guest instructions, the native user interface type being selected from a plurality of possible user interface types corresponding to different platforms.

At operation 765, the application customization system (or a subsystem thereof) is configured to, and can, cause the application to display, via the user interface, the at least one user interface element associated with the guest instructions according to the native user interface type.

In some examples, the application customization system that performs the process 750 includes the customization system 135 as discussed with respect to FIG. 1, for instance with the guest instructions of operation 755 representing the guest instructions 140, with selection of the native UI type in operation 760 representing generation of the customized guest instructions 145, and with operation 765 representing causing the client device 120 to run the customized guest instructions 145 in the guest environment 115. In this way, the customization system 135 can perform at least operations 755, 760, and/or 765. In some examples, the application customization system that performs the process 700 also includes the management system 105 and/or the application repository 117.

In some examples, the application customization system that performs the process 750 includes the client device 120. For instance, in some examples, at least a subset of the functions described with respect to FIG. 1 as being performed by the customization system 135 can instead be performed at the client device 120. In such examples, the client device 120 can perform at least operations 755, 760, and/or 765. For instance, in such examples, the client device 120 can receive guest instructions in operation 755 that are platform-agnostic, user agnostic, app-agnostic (e.g., able to be incorporated into different applications), and/or device agnostic as in the guest instructions 140 of FIG. 1. The client device 120 can performs operation 760 to customize the guest instructions to generate the customized guest instructions 145, and can run the customized guest instructions 145 in operation 765.

The process 700 and/or the process 750 provide technical solutions by providing a customized application with a guest environment running up-to-date customized guest instructions is reliably up-to-date without having to rely on the user updating the app as a whole (e.g., downloading an up-to-date version of the app from an app store or other app repository). The process 700 and/or the process 750 provide functions in such a customized application that run as quickly and efficiently as local functions, since the functions of the customized guest instructions can be run locally as local functions, and do not suffer from the network latency since communications with a remote server are not needed to keep the app working (e.g., as in remote functions). The process 700 and/or the process 750 provide a customized application that can continue to fully function without a network (e.g., internet access) accessible to the client device, unlike an application that relies on remote functions. The process 700 and/or the process 750 provide a customized application with benefit(s) including a reduction in network latency compared to an application that relies on remote functions and improved flexibility and reliability compared to an application that relies on remote functions.

Figure 8:
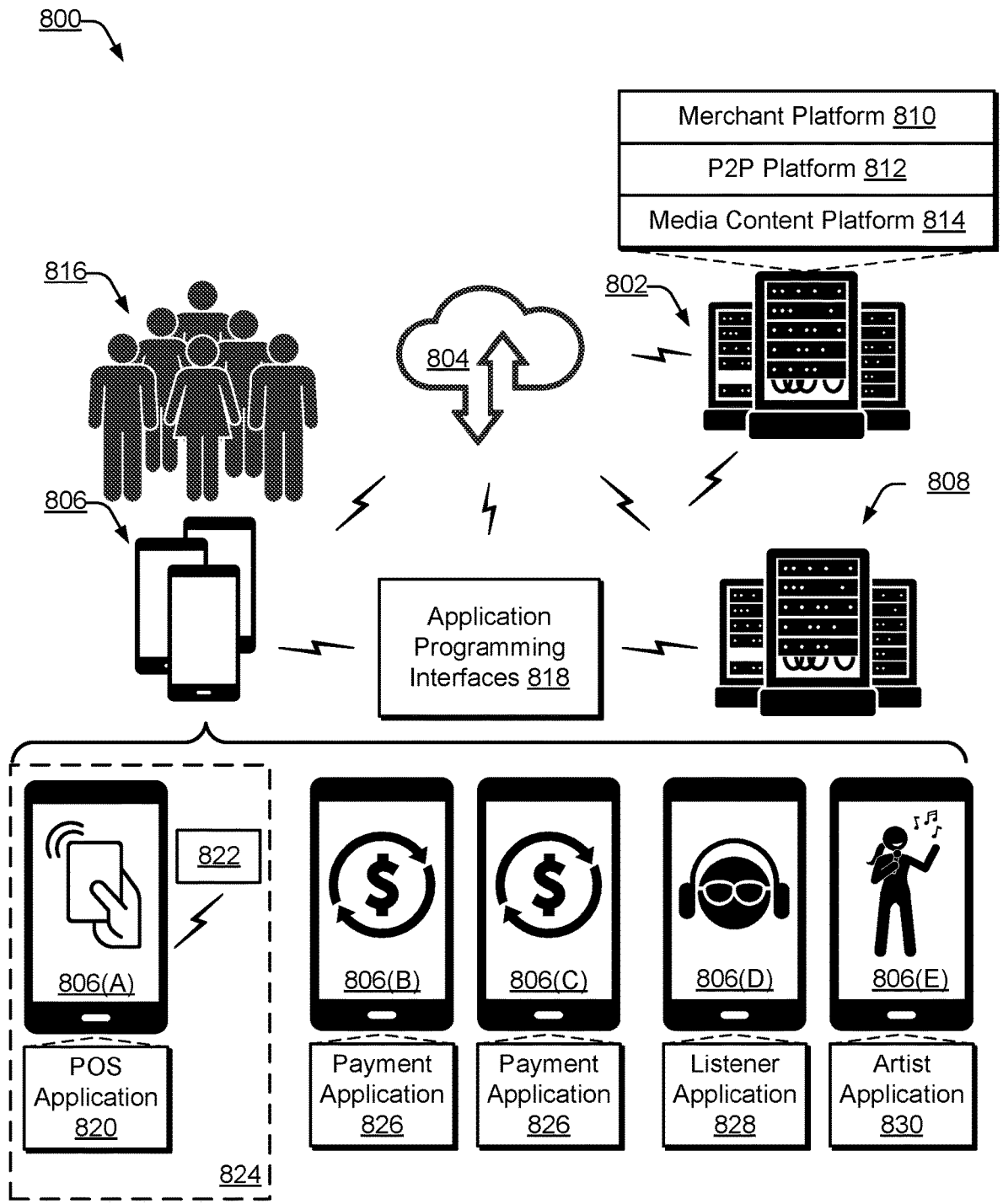
FIG. 8 is a block diagram illustrating an example environment for providing an application and/or for customizing the application for different platforms, in accordance with some examples.

FIG. 8 illustrates an example environment 800 for application interface customization. The environment 800 includes server(s) 802 that can communicate over a network 804 with end user devices 806 and/or server(s) 808 associated with third-party service provider(s). In various examples, the end user devices 806 may comprise one or more merchant devices 806(A), one or more user devices 806(B) and/or 806(C) in a peer network, one or more content consumption devices 806(D), one or more artist user devices 806(E), combinations of these examples, or other categories of user devices. The server(s) 802 can be associated with one or more service providers that can provide one or more services for the benefit of users 816, as described below. For example, the server(s) 802 may enable services of service providers such as in association with a merchant platform 810 (which may further include a buyer platform), a peer-to-peer (P2P) payment platform 812, a media content platform 814, a combination of these platforms, or other platforms associated with other service providers. While services and features are referenced throughout in connection with a particular one of the merchant platform 810, the P2P payment platform 812, or the media content platform 814, it should be understood that any of these platforms may perform the functionality described in relation to any of the other platforms. Actions attributed to the service provider(s) can be performed by the server(s) 802.

In some examples, the end user devices 806 can be examples of the client device 120, the client device 240, the client device 245, and/or the client device 305. The merchant platform 810, P2P platform 812, and media content platform 814 can be examples of the management system 105, the app repository 117, the customization system 135, the server 350, and/or the application interface customization system 400. The POS application 820, the payment application 826, the listener application 828, and the artist application 830 are all examples of the application 125, the application 230, the application 440, the application 450, the application of the process 700, and/or the application of the process 750, and can each include host instructions 110 with a guest environment 115 for running customized guest instructions 145.

In some examples, individual ones of the end user devices 806 can be operable by users 816. The users 816 (individually referred to herein as "user 816") can be referred to as customers, buyers, merchants, sellers, borrowers, employees, employers, payors, payees, couriers, artists, musicians, listeners, fans, supervisors, hosts, audience members, and so on. The users 816 can interact with the end user devices 806 via user interfaces presented via the end user devices 806. In at least one example, a user interface can be presented via a web browser, or the like. Alternatively or additionally, a user interface can be presented via an application, such as a mobile application or desktop application, which can be provided by the merchant platform 810, the P2P payment platform 812, and/or the media content platform 814, or which can be an otherwise dedicated application. In some examples, individual end user devices 806 can have an instance or versioned instance of an application, which can be downloaded from an application store, for example, which can present the user interface(s) described herein.

In at least one example, the users 816 can include merchants that can operate the seller device(s) 806(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 806(A) can have an instance of a point of sale ("POS") application 820820 stored thereon. The POS application 820 can configure the seller device 806(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 820 can determine transaction data associated with the POS transactions. Transaction data can include payment information, which can be obtained from a reader device 822 associated with the seller device 806(A), user authentication data, purchase amount information, point-of-purchase information (e.g., item(s) purchased, date of purchase, time of purchase, subscription type, etc.), etc. The POS application 820 can send transaction data to the server(s) 802 such that the server(s) 802 can track transactions of the customers, merchants, and/or the users 816 over time. Furthermore, the POS application 820 can present a UI to enable the merchant to interact with the POS application 820 and/or the merchant platform 810 via the POS application 820.

In at least one example, the seller device 806(A) can be a special-purpose computing device configured as a POS terminal (via the execution of the POS application 820). In at least one example, the POS terminal may be connected to a reader device 822, which is capable of accepting a variety of payment instruments, such as credit cards, debit cards, gift cards, short-range communication based payment instruments, and the like, as described below. In at least one example, the reader device 822 can plug in to a port in the seller device 806(A), such as a microphone port, a headphone port, an audio-jack, a data port, or other suitable port. In additional or alternative examples, the reader device 822 can be coupled to the seller device 806(A) via another wired or wireless connection, such as via Bluetooth®, BLE, and so on. In some examples, the reader device 822 can be a software solution executing on the POS terminal, e.g., a mobile phone. In some examples, the reader device 822 can read information from alternative payment instruments including, but not limited to, wristbands and the like.

In some examples, the reader device 822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 822, and communicate with the merchant platform 810, which can provide, among other services, a payment processing service. The server(s) 802 associated with the merchant platform 810 can communicate with server(s) 808, as described below. In this manner, the POS terminal and reader device 822 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 822 of the POS system 824 are shown as separate devices, in additional or alternative examples, the POS terminal and the reader device 822 can be part of a single device. In some examples, the reader device 822 can have a display integrated therein for presenting information to customers of a merchant. In additional or alternative examples, the POS terminal can have a display integrated therein for presenting information to the customers of the merchant. POS systems, such as the POS system 824, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 822, whereby the reader device 822 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 824, the server(s) 802, and/or the server(s) 808 may exchange payment information and transaction data to determine whether transactions are authorized. For example, the POS system 824 may provide encrypted payment data, user authentication data, purchase amount information, point-of-purchase information, etc. (collectively, transaction data) to server(s) 802 over the network(s) 804. The server(s) 802 may send the transaction data to the server(s) 808.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 808 associated therewith) can forward the fund transfer request to an issuing bank (e.g., "issuer"). The issuer is a bank or financial institution that offers a financial account (e.g., credit or debit card account) to a user. The issuer (e.g., the server(s) 808 associated therewith) can make a determination as to whether the customer has the capacity to absorb the relevant charge associated with the payment transaction. In at least one example, the merchant platform 810 can serve as an issuer and/or can partner with an issuer. The transaction is either approved or rejected by the issuer and/or the card payment network (e.g., the server(s) 808 associated therewith), and a payment authorization message is communicated from the issuer to the POS device via a path opposite of that described above, or via an alternate path.

The server(s) 808 may send an authorization notification over the network(s) 804 to the server(s) 802, which may send the authorization notification to the POS system 824 over the network(s) 804 to indicate whether the transaction is authorized. The server(s) 802 may also transmit additional information such as transaction identifiers to the POS system 824. In one example, the server(s) 802 may include a merchant application and/or other functional components for communicating with the POS system 824 and/or the server(s) 808 to authorize or decline transactions (e.g., the API 818818). In examples, the merchant platform 810 can enable the merchants to receive cash payments, payment card payments, and/or electronic payments from customers for POS transactions and the service provider can process transactions on behalf of the merchants.

Based on the authentication notification that is received by the POS system 824 from server(s) 802, the merchant may indicate to the customer whether the transaction has been approved. In some examples, approval may be indicated at the POS system 824, for example, at a display of the POS system 824. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The merchant platform 810 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the users 806 can access all of the services. In some cases, the users 806 can have gradated access to the services, which can be based on risk tolerance, IDV outputs, subscriptions, and so on. In at least one example, access to such services can be availed to the merchants via the POS application 820. In additional or alternative examples, each service can be associated with its own access point (e.g., application, web browser, etc.).

As the merchant platform 810 processes transactions on behalf of the merchants, the merchant platform 810 can maintain accounts or balances for the merchants in one or more ledgers. For example, the merchant platform 810 can analyze transaction data received for a transaction to determine an amount of funds owed to a merchant for the transaction and deposit funds into an account of the merchant. The account can have a stored balance, which can be managed by the merchant platform 810. The account can be different from a conventional bank account at least because the stored balance is managed by a ledger of the merchant platform 810 and the associated funds are accessible via various withdrawal channels including, but not limited to, scheduled deposit, same-day deposit, instant deposit, and a linked payment instrument.

A scheduled deposit can occur when the merchant platform 810 transfers funds associated with a stored balance of the merchant to a bank account of the merchant that is held at a bank or other financial institution (e.g., associated with the server(s) 808). Scheduled deposits can occur at a pre-arranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the merchant platform 810 to the bank account of the merchant.

In at least one example, the merchant platform 810 may provide inventory management services. That is, the merchant platform 810 may provide inventory tracking and reporting. Inventory management services may enable the merchant to access and manage a database storing data associated with a quantity of each item that the merchant has available (i.e., an inventory). Furthermore, in at least one example, the merchant platform 810 can provide catalog management services to enable the merchant to maintain a catalog, which can be a database storing data associated with items that the merchant has available for acquisition (i.e., catalog management services). The merchant platform 810 can offer recommendations related to pricing of the items, placement of items on the catalog, and multi-party fulfillment of the inventory, to name a few examples.

In at least one example, the merchant platform 810 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the merchant platform 810 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the merchant platform 810 can provide financing services for offering and/or lending a loan to a borrower that is to be used for, in some instances, financing the borrower's short-term operational needs (e.g., a capital loan). Additionally or alternatively, the merchant platform 810 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The merchant platform 810 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The merchant platform 810 can provide web-development services, which enable users 816 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the merchant platform 810 can recommend and/or generate content items to supplement omni-channel presences of the merchants.

Furthermore, the merchant platform 810 can provide payroll services to enable employers to pay employees for work performed on behalf of employers. In at least one example, the merchant platform 810 can receive data that includes time worked by an employee (e.g., through imported timecards and/or POS interactions), sales made by the employee, gratuities received by the employee, and so forth. Based on such data, the merchant platform 810 can make payroll payments to employee(s) on behalf of an employer via the payroll service. For instance, the merchant platform 810 can facilitate the transfer of a total amount to be paid out for the payroll of an employee from the bank of the employer to the bank of the merchant platform 810 to be used to make payroll payments. In at least one example, when the funds have been received at the bank of the merchant platform 810, the merchant platform 810 can pay the employee, such as by check or direct deposit.

Moreover, in at least one example, the merchant platform 810 can provide employee management services for managing schedules of employees. Further, the merchant platform 810 can provide appointment services for enabling users 816 to set schedules for scheduling appointments and/or users 816 to schedule appointments.

In some examples, the merchant platform 810 can provide restaurant management services to enable users 816 to make and/or manage reservations, to monitor front-of-house and/or back-of-house operations, and so on. In such examples, the seller device(s) 806(A) and/or server(s) 802 can be configured to communicate with one or more other computing devices, which can be located in the front-of-house (e.g., POS device(s)) and/or back-of-house (e.g., kitchen display system(s) (KDS)). In at least one example, the merchant platform 810 can provide order management services and/or fulfillment services to enable restaurants (or other merchant types) to manage open tickets, split tickets, and so on and/or manage fulfillment services.

In some examples, the merchant platform 810 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the merchant platform 810 can leverage other merchants and/or sales channels that are part of the merchant platform 810 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the merchant platform 810 can enable conversational commerce via conversational commerce services, which can use one or more machine learning mechanisms to analyze messages exchanged between two or more users 816, voice inputs into a virtual assistant or the like, to determine intents of user(s) 816. In some examples, the merchant platform 810 can utilize determined intents to automate customer service, offer promotions, provide recommendations, or otherwise interact with customers in real-time. In at least one example, the merchant platform 810 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 816 may be new to the merchant platform 810 such that the user 816 that has not registered (e.g., subscribed to receive access to one or more services offered by the merchant platform 810) with the merchant platform 810. The merchant platform 810 can offer onboarding services for registering a potential user 816 with the merchant platform 810. In some examples, onboarding can involve presenting various questions, prompts, and the like to a potential user 816 to obtain information that can be used to generate a profile for the potential user 816. In at least one example, the merchant platform 810 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the merchant platform 810 can be transitioned to more permissive (e.g., less limited) or longer-term access to such services.

The merchant platform 810 can be associated with IDV services, which can be used by the merchant platform 810 for compliance purposes and/or can be offered as a service, for instance to third-party service providers (e.g., associated with the server(s) 808). That is, the merchant platform 810 can offer IDV services to verify the identity of users 816 seeking to use or using their services. Identity verification may involve requesting a customer (or potential customer) to provide information that is used by compliance departments to prove that the information is associated with an identity of a real person or entity (e.g., an artist). In at least one example, the merchant platform 810 can perform services for determining whether identifying information provided by a user 816 accurately identifies the customer (or potential customer).

Techniques described herein can be configured to operate in both real-time/online and offline modes. "Online" modes refer to modes when devices are capable of communicating with the merchant platform 810 while offline mode refers to modes when devices are unable to communicate with the server(s) 808 due to network connectivity issue, for example. In such examples, devices may operate in "offline" mode where at least some payment data is stored (e.g., on the seller device(s) 806(A)) and/or the server(s) 802 until connectivity is restored and the payment data can be transmitted to the server(s) 802 and/or the server(s) 808 for processing.

In at least one example, the merchant platform 810 can be associated with a hub, such as an order hub, an inventory hub, a fulfillment hub and so on, which can enable integration with one or more additional service providers (e.g., associated with the additional server(s) 808). In some examples, such additional service providers can offer additional or alternative services and the service provider can provide an interface or other computer-readable instructions to integrate functionality of the service provider into the one or more additional service providers.

Turning now to the P2P functionality provided by the environment 800, the P2P platform 812 can provide a peer-to-peer payment service that enables peer-to-peer payments between two or more of the users 816. Two or more of the users 816 may be considered "peers" in a peer-to-peer interaction, such as a payment. In at least one example, the P2P platform 812 can communicate with instances of a payment application 826 (or other access point) installed on end user devices 806 configured for operation by the users 816. In an example, an instance of the payment application 826 executing on a first user device 806(B) operated by a payor (e.g., one of the users 816) can send a request to the P2P platform 812 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 816) via a peer-to-peer payment. In some examples, assets associated with an account of the payor are transferred to an account of the payee. In some examples, assets can be held at least temporarily in an account of the P2P platform 812 prior to transferring the assets to the account of the payee.

Figure 9:
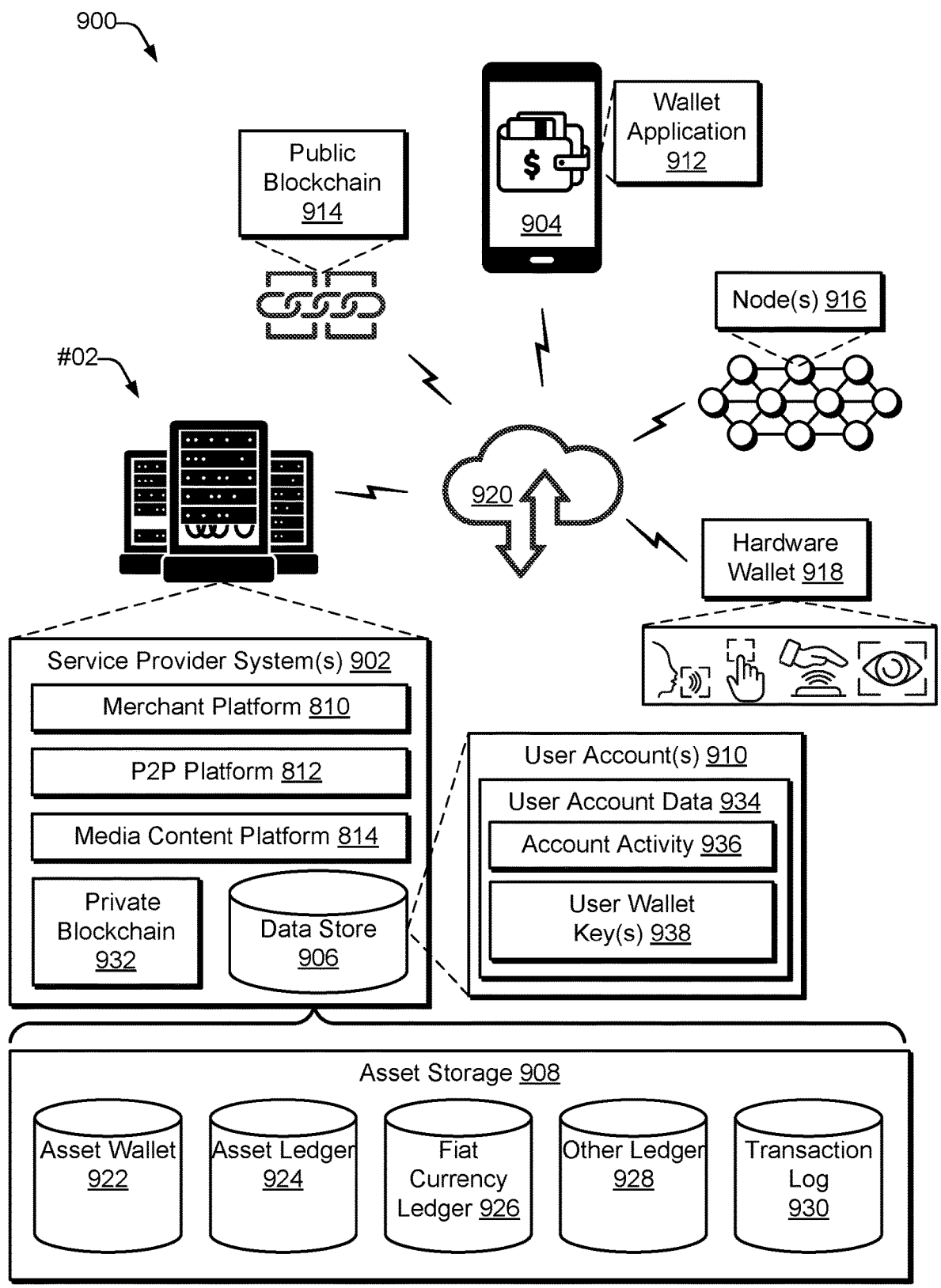
FIG. 9 is a block diagram illustrating an example environment including a service provider system which may be associated with the server(s) of FIG. 8, in accordance with some examples.

In some examples, the P2P platform 812 can utilize a ledger system to track transfers of assets between users 816. FIG. 9, below, provides additional details associated with such a ledger system. The ledger system can enable users 816 to own fractional shares of assets that are not conventionally available. For instance, a user can own a fraction of a Bitcoin, an NFT, or a stock. Additional details are described herein.

In at least one example, the P2P platform 812 can facilitate transfers and can send notifications related thereto to instances of the payment application 826 executing on user device(s) of payee(s). As an example, the P2P platform 812 can transfer assets from an account of a first user to an account of a second user and can send a notification to the user device 806(B) of the second user for presentation via a user interface. The notification can indicate that a transfer is in process, a transfer is complete, or the like. In some examples, the P2P platform 812 can send additional or alternative information to the instances of the payment application 826 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 812 funds the request to payee on behalf of the payor, to speed up the transfer process and compensate for lags that may be attributed to the payor's financial network.

In some examples, the P2P platform 812 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 826 executing on the end user devices 806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 812 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 8 or a third-party service provider associated with the server(s) 808. In examples where the content provider is a third-party service provider, the server(s) 808 can be accessible via one or more APIs 81818 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 812 (e.g., the P2P platform 812 offers a chat or messaging service that is within the payment application or accessible via the payment application). In some examples, the messaging application can be external to the P2P platform 812. (e.g., the messaging application is hosted by a third-party service provider associated with the server(s) 808, which can be accessible via one or more of the APIs 81818 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 812 can enable users 816 to perform banking transactions via instances of the payment application 826. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 812 can enable users to allocate funds between different accounts, sub-accounts, or balances (e.g., spending, saving, different assets, different currencies), etc. Further, users 816 can configure bill pay, recurring payments, and/or the like using assets associated with their accounts. In some examples, the P2P platform 812, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 812 enables users to buy and/or sell assets via asset networks such as cryptocurrency networks, securities networks, and/or the like. In some examples, acquisition of such assets can be in whole or fractional shares. The ledger system described below with reference to FIG. 9 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 812 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 812 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 812 can automatically apply the amount of funds associated with the gift card to the transaction.

In some examples, users can configure their account such that when they use their payment instruments, the P2P platform 812 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 812 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 812 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 812 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 812.

In some examples, components of the environment 800 may be integrated to enable payments at the point-of-sale using assets associated with user accounts of the P2P platform 812. As illustrated in the environment 800, the components can communicate with one another via the network 804, where one or more APIs 81818 or other functional components can be used to facilitate such communication.

In at least one example, an integration can enable a customer to participate in a transaction via their own computing device (e.g., user device 806(B)) instead of interacting with a merchant device of a merchant, such as the seller device 806(A). In such an example, the POS application 820, associated with a payment processing platform and executable by the seller device 806(A) of the merchant, can present a Quick Response (QR) code, or other code that can be used to identify a transaction (e.g., a transaction code), in association with a transaction between the customer and the merchant. The QR code, or other transaction code, can be provided to the POS application 82020 via an API 81818 associated with the peer-to-peer payment platform. In an example, the customer can utilize their own computing device, such as the user device 806(B), to capture the QR code, or the other transaction code, and to provide an indication of the captured QR code, or other transaction code, to server(s) 802.

Based at least in part on the integration of the peer-to-peer payment platform and the payment processing platform (e.g., via the API 81818), the server(s) 802 of the merchant platform 810 can exchange communications with a payment application 826 associated with the P2P platform 812 and/or the POS application 82020 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 812 and merchant platform 810 (which can be a first- or third-party integration) such that a QR code, or other transaction code, specific to the transaction can be used for providing transaction details, location details, customer details, or the like to a computing device of the customer, such as the user device 806(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 806(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 820 and the payment application 826, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 806(B), can be specially configured as a buyer-facing device having functionality similar to the functionality described above in the brick-and-mortar example.

In some examples, based at least in part on capturing the QR code, or other transaction code, the merchant platform 810 can provide transaction data to the P2P platform 812 for presentation via the payment application 82626 on the computing device of the customer, such as the user device 806B(B), to enable the customer to complete the transaction via their own computing device. In some examples, in response to receiving an indication that the QR code, or other transaction code, has been captured or otherwise interacted with via the customer computing device, the P2P platform 812 can determine that the customer authorizes payment of the transaction using funds associated with a stored balance of the customer that is managed and/or maintained by the P2P platform 812. Such authorization can be implicit such that the interaction with the transaction code can imply authorization of the customer. Alternatively or additionally, the P2P platform 812 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 812 can transfer funds from the stored balance of the customer to the merchant platform 810. In at least one example, the merchant platform 810 can deposit the funds, or a portion thereof, into a stored balance of the merchant that is managed and/or maintained by the merchant platform 810. In such an example, the merchant platform 810 can be a "peer" to the customer in a peer-to-peer transaction.

In some examples, techniques described herein can enable the customer to interact with the transaction after payment for the transaction has been settled. For example, in at least one example, the merchant platform 810 can cause a total amount of a transaction to be presented via a user interface associated with the payment application 826 such that the customer can provide gratuity, feedback, loyalty information, or the like, via an interaction with the user interface. In another example, the merchant platform 810 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 812, if the customer inputs a tip and/or an event affecting the total amount of the transaction is triggered, the P2P platform 812 can transfer additional funds, associated with the tip or event, to the merchant platform 810. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 826 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 812 as described herein (e.g., a debit card linked to a stored balance of a customer) such that when the payment instrument is caused to interact with a payment reader, the merchant platform 810 can exchange communications with the P2P platform 812 to authorize payment for a transaction and/or provision associated transaction data to a computing device of the customer associated with the transaction.

Turning now to media content functionality provided by the environment 800, the media content platform 814 can provide digital media to a content consumption device 806(D) where playback may occur using "streaming." In examples, "streaming" media content involves encoding the media content and transmitting the encoded media content over the network 804 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 814 can provide a digital media streaming service (e.g., subscription-based, non-subscription-based) that enables a content consumption device 806(D) to stream and/or download digital media content via a listener application 828 installed on the content consumption device 806(D). For instance, the media content platform 814 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 806(D), the listener application 828 may verify access rights to the digital media content items at time intervals, for instance intermittently (e.g., when the content consumption device 806(D) has a network connection with the media content platform 814 via the network(s) 804), and/or at regular intervals (e.g., daily, weekly, monthly, etc.). In examples, access rights to the digital media content items may be provided when a subscription to the media content platform 814 is active, while access rights to the digital media content items may be withheld when the subscription to the media content platform 814 is terminated. Enabling storage on the end user devices 806 and subsequent access to digital media content items via the listener application 828 provides the users 816 with the ability to access the digital media content items "offline" such as when a connection to the media content platform 814 via the network(s) 804 is unavailable or unreliable.

In some examples, the media content platform 814 may additionally or alternatively provide an artist management service that enables the users 816 to manage aspects of artist business via an artist application 830 installed on the artist device 806(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 816 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 816 may have access to a single user account via respective end user devices 806, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 830 and the listener application 828 may be distinct applications having differing user experiences and verification processes for access, such as illustrated in the environment 800. For instance, the media content platform 814 may request additional verification, such as a link to an artist website, a sample of an artist's work, a verified credential supplied by a third party, etc. to grant access to the artist application 830 in addition to information requested to access the listener application 828. Further, the artist application 830 may provide the artist management services described herein, without the subscription-based digital media streaming services described herein, and vice versa. However, examples are also considered in which functionality provided by the artist application 830 and the listener application 828 partially or fully overlap, and/or where verification processes for access are substantially similar.

In at least some examples, the media content platform 814 enables interaction between the users 816 utilizing the listener application 828 installed on the content consumption devices 806(D), and the users 816 utilizing the artist application 830 installed on the artist user devices 806(E). For example, the media content platform 814 may provide interconnectivity between the subscription-based digital media streaming service and the artist management service. Functionality provided by the media content platform 814 in such instances may include a communication channel between one or more of the users 816 (e.g., a listener, fan, music supervisor, publisher, etc.) utilizing the listener application 828 and another user (e.g., an artist) of the users 816 utilizing the artist application 830. The communication channel may include, for instance, a messaging platform (also referred to as a "messaging application" herein), a live streaming platform, a videoconferencing or teleconferencing platform, and/or a combination of these.

Additionally, in some cases, the media content platform 814 may facilitate a resource transfer between the listener application 828 and the artist application 830. In an example, the media content platform 814 may direct a resource, such as a portion of a subscription fee paid by one of the users 816 designated as a listener, to one or more of the users 816 designated as artists based on a number of instances that the listening user consumed (e.g., streamed, downloaded, etc.) content created by respective ones of the artist users. Alternatively or additionally, the media content platform 814 may direct a resource, such as funds, from an account associated with a listening user to an account associated with an artist user (or vice versa), in accordance with transfers between accounts as described herein. The media content platform 814 may facilitate resource transfers in examples such as merchandise purchases, event ticket purchases, "tipping" an artist, payments for royalties or other fees, and so forth.

In some examples, the media content platform 814 enables interaction between individual ones of the users 816 with one another via the listener application 828 installed on the content consumption device 806(D) and other of the content consumption devices 806(D) via a communication channel as described above. In an example, the listener application 828 may provide functionality via a communication channel for a user to stream an individual digital media item, a playlist, or the like to an audience comprising other ones of the content consumption devices 806(D). Alternatively or additionally, the communication channel may facilitate sharing of individual digital media items, playlists, user and/or artist profiles, and the like between the users 816 via messages, uniform resource locators (URLs), quick response (QR) codes, and so forth.

In some cases, the media content platform 814 enables interaction between individual ones of the users 816 with one another via the artist application 830 installed on the artist device 806(E) and other of the artist user devices 806 via a communication channel as described above. In some instances, the media content platform 814 may provide recommendations for a particular user indicating which of the other users 816 to communicate with. Such a recommendation may be based on a similarity (or dissimilarity) of content created by two or more of the users 816, an overlap (or lack thereof) of audience members of the users 816, a geographic location of the users 816, a coinciding event location of the users 816, and so forth. In some examples, a user may input parameters for a desired connection via the artist application 830, and the media content platform 814 may filter which of the users 816 to surface for recommendations to the user based on the input parameters. Alternatively or additionally, the media content platform 814 may implement one or more machine learning models to filter which of the users 816 to surface for recommendations to the user. The recommendations provided by the media content platform 814 may be data driven and thus increase relevance of communications presented to the users 816 and reduce unsolicited communications that may be received by the users 816.

The media content platform 814 may interact with the server(s) 808 associated with the third-party service providers to, for instance, ingest digital media items, report digital media consumption data, pay royalties, and the like. In some examples, the server(s) 808 may be accessible by the media content platform 814 via one or more APIs 81818 or other integrations. In some cases, the third-party service provider may be a digital media content provider (e.g., a record label, a performance rights organization (PRO), an independent artist, etc.). In such cases, the media content platform 814 may receive digital media content items from the server(s) 808, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 814 may use the metadata to associate the digital media content item as being created by a particular user, to provide search results to the users 816, to generate playlists, and so forth. Further, the media content platform 814 may provide payments (e.g., royalties) to the third-party service provider based on a number of streams and/or downloads of individual digital media content items by the users 816 via the listener application 828.

Techniques described herein are directed to services provided via a distributed system of end user devices 806 that are in communication with server(s) 802 of the service provider. That is, techniques described herein are directed to a specific implementation or, a practical application—of utilizing a distributed system of end user devices 806 that are in communication with server(s) 802 of the merchant platform 810, the P2P platform 812, and/or the media content platform 814 to perform a variety of services, as described above. The unconventional configuration of the distributed system described herein enables the server(s) 802 that are remotely-located from end-users (e.g., users 816) to intelligently offer services based on aggregated data associated with the end-users, such as the users 816 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the merchant platform 810, the P2P platform 812, and/or the media content platform 814, and those outside of the control of these service providers, to track the standing (payables, receivables, payroll, invoices, appointments, capital, balances, collaborations, etc.) of the users 816. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 816 and end user devices 806. Furthermore, such features are changed dynamically based on the profiles of the users involved interacting with the GUIs. As such, techniques described herein are directed to improvements to computing systems.

The merchant platform 810, the P2P platform 812, and/or the media content platform 814 are capable of providing additional or alternative services, and the services described above are offered as a sampling of services. In at least one example, the merchant platform 810, the P2P platform 812, and/or the media content platform 814 can exchange data with the server(s) 808 associated with third-party service providers. Such third-party service providers can provide information that enables the merchant platform 810, the P2P platform 812, and/or the media content platform 814 to provide services, such as those described above. In additional or alternative examples, such third-party service providers can access services of the merchant platform 810, the P2P platform 812, and/or the media content platform 814. That is, in some examples, the third-party service providers can be subscribers, or otherwise access, services of the merchant platform 810, the P2P platform 812, and/or the media content platform 814.

FIG. 9 illustrates an example environment 900 including a service provider system 902 which may be associated with the server(s) 802 of FIG. 8. The environment 900 may also include a user device 904, which may correspond to any of the end user devices 806 described in relation to FIG. 8. In examples, the service provider system 902 may include one or a combination of the merchant platform 810, the P2P platform 812, or the media content platform 814, as well as one or more data store(s) 906 that can store assets in an asset storage 908, as well as data in user account(s) 910. In some examples, the environment 900 may also include a public blockchain 914, one or more nodes 916, and/or a hardware wallet 918. The service provider system 902, the user device 904, public blockchain 914, the node(s) 916, and the hardware wallet 918 may be connected and able to communicate via one or more networks 920, which may have the same or similar functionality described in relation to the network 804 of FIG. 8.

In some examples, user account(s) 910 can include merchant account(s), customer account(s), media content subscriber account(s), artist account(s), and so forth. In at least one example, the asset storage 908 can be used to record whether individual assets are registered to a user account 910. For example, the asset storage 908 can include asset wallet(s) 922 for storing records of assets owned by the service provider system 902, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 808 of FIG. 8 can be associated therewith.

The asset wallet 922 can be associated with one or more addresses and can vary addresses used to acquire assets (e.g., from the asset network(s)) so that its holdings are represented under a variety of addresses on the asset network. In examples where the service provider system 902 has holdings of cryptocurrency (e.g., in the asset wallet 922), a user can acquire cryptocurrency directly from the service provider system 902. In some examples, the service provider system 902 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 902 can provide the same or similar functionality for securities or other assets.

The asset storage 908 may contain ledgers that store records of assignments of assets to users 816. Specifically, the asset storage 908 may include asset ledger 924, fiat currency ledger 926, and/or other ledger(s) 928, which can be used to record transfers of assets between users 816 and/or one or more third-parties (e.g., merchant network(s), payment card network(s), ACH network(s), equities network(s), the asset network, securities networks, etc.). In doing so, the asset storage 908 can maintain a running balance of assets managed by the service provider system 902. The ledger(s) of the asset storage 908 can further indicate some of the running balance for individual ledger(s) stored in the asset storage 908 are assigned or registered to one or more user account(s) 910.

In at least one example, the asset storage 908 can include transaction logs 930, which can include, as transaction data, records of past transactions involving the service provider system 902 and/or the user account 910. In some examples, the data store(s) 906 can store a private blockchain 932. A private blockchain 932 can function to record sender addresses, recipient addresses, public keys, values of cryptocurrency transferred, and/or can be used to verify ownership of cryptocurrency tokens to be transferred. In some examples, the service provider system 902 can record transactions involving cryptocurrency until the number of transactions has exceeded a determined limit (e.g., number of transactions, storage space allocation, etc.). Based at least in part on determining that the limit has been reached, the service provider system 902 can publish the transactions in the private blockchain 932 to the public blockchain 914 (e.g., associated with the asset network), where miners can verify the transactions and record the transactions to blocks on the public blockchain 914. In at least one example, the service provider system 902 can participate as miner(s) at least for transactions to which the respective platform is a party to, to be posted to the public blockchain 914.

In some cases, the data store(s) 906 can store and/or manage multiple user accounts, an example of which is described in relation to the user account 910. In at least one example, the user account 910 can include user account data 934, which can include, but is not limited to, data associated with user identifying information (e.g., name, phone number, address, artist or band name, verfied credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 934 can include account activity 936 and user wallet key(s) 938. In some examples, the user wallet key(s) 938 can include a public-private key-pair and a respective address associated with the asset network or other asset networks. In some examples, the user wallet key(s) 938 may include one or more key pairs, which can be unique to the asset network or other asset networks.

In addition to the user account data 934, the user account 910 can include ledger(s) for account(s) managed by the service provider system 902, for the user. For example, the user account 910 may include an asset ledger 924, a fiat currency ledger 926, and/or one or more other ledgers 928. The ledger(s) can indicate that a corresponding user utilizes the service provider system 902 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 902.

In some examples, the asset ledger 924 can store a balance for each of one or more cryptocurrencies (e.g., Bitcoin, Ethereum, Litecoin, etc.) registered to the user account 910. In at least one example, the asset ledger 924 can further record transactions of cryptocurrency assets associated with the user account 910. For example, the user account 910 can receive cryptocurrency from the asset network using the user wallet key(s) 938. In some examples, the user wallet key(s) 938 may be generated for the user upon request. User wallet key(s) 938 can be requested by the user in order to send, exchange, or otherwise control the balance of cryptocurrency held by the service provider system 902 (e.g., in the asset wallet 922) and registered to the user. In some examples, the user wallet key(s) 938 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 902 and the value is credited as a balance in asset ledger 924), by purchasing currency in the form associated with the account using currency in a different form (e.g., buying a value of cryptocurrency from the service provider system 902 using a value of fiat currency reflected in fiat currency ledger 926926, and crediting the value of cryptocurrency in asset ledger 924), or by conducting a transaction with another user (customer or merchant) of the service provider system 902 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 902 (i.e., an external account). Such a transaction can request that the user to transfer an amount of the cryptocurrency in a message signed by user's private key to an address provided by the service provider system 902. In at least one example, the transaction can be sent to miners to bundle the transaction into a block of transactions and to verify the authenticity of the transactions in the block. Once a miner has verified the block, the block is written to the public blockchain 914 where the service provider system 902 can then verify that the transaction has been confirmed and can credit the user's asset ledger 924 with the transferred amount. When an account is funded by transferring cryptocurrency from a third-party cryptocurrency wallet, an update can be made to the public blockchain 914. In some cases, this update of the public blockchain 914 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 902. As described above, in some examples, the service provider system 902 can acquire cryptocurrency from a third-party source. In examples where the service provider system 902 has its own cryptocurrency assets, cryptocurrency transferred in a transaction (e.g., data with address provided for receipt of transaction and a balance of cryptocurrency transferred in the transaction) can be stored in an asset wallet 922 associated with the service provider system 902. In at least one example, the service provider system 902 can credit the asset ledger 924 of the user. Additionally, while the service provider system 902 recognizes that the user retains the value of the transferred cryptocurrency through crediting the asset ledger 924, an inspection of the blockchain will show the cryptocurrency as having been transferred to the service provider system 902. In some examples, the asset wallet 922 can be associated with many different addresses. In such examples, an inspection of the blockchain may not necessarily associate all cryptocurrency stored in asset wallet 922 as belonging to the same entity. The presence of a private ledger used for real-time transactions and maintained by the service provider system 902, combined with updates to the public ledger at other times, allows for extremely fast transactions using cryptocurrency to be achieved. In some examples, the "private ledger" can refer to the asset ledger 924, which in some examples, can utilize the private blockchain 932, as described herein. The "public ledger" can correspond to the public blockchain 914 associated with the asset network.

In at least one example, an asset ledger 924, fiat currency ledger 926, or the like associated with the user account 910 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 924. In some examples, a user can receive fiat currency or another currency in the form of payment for a transaction with another user. In at least one example, at least a portion of such funds can be converted into cryptocurrency by the service provider system 902 and used to fund the asset ledger 924 of the user.

In examples, a user can also have an account in U.S. dollars, which can be tracked, for example, via the fiat currency ledger 926. Such an account can be funded by transferring money from a bank account at a third-party bank to an account maintained by the service provider system 902 as is conventionally known. In some examples, a user can receive fiat currency in the form of payment for a transaction with another user. In such examples, at least a portion of such funds can be used to fund the fiat currency ledger 926.

In some examples, a user can have one or more internal payment cards registered with the service provider system 902. Internal payment cards can be linked to one or more of the accounts associated with the user account 910. In some embodiments, options with respect to internal payment cards can be adjusted and managed using an application (e.g., the payment application 826, a wallet application 912, etc.).

In at least one example, the user account 910 can be associated with the asset wallet accessible via a wallet application 912 of the user device 904, or a stored balance for use in payment transactions, peer-to-peer transactions, payroll payments, etc. In at least one example, the asset wallet 922 can store data indicating an address provided for receipt of a cryptocurrency transaction. In at least one example, the balance of the asset wallet 922 can be based at least in part on a balance of the asset ledger 924. In at least one example, funds availed via the asset wallet 922 can be stored in the asset wallet 922. Funds availed via the asset wallet 922 can be tracked via the asset ledger 924. The asset wallet 922, however, can be associated with additional cryptocurrency funds.

In at least one example, when the service provider system 902 includes a private blockchain 932 for recording and validating cryptocurrency transactions, the asset wallet 922 can be used instead of, or in addition to, the asset ledger 924. For example, a merchant can provide the address of the asset wallet 922 for receiving payments. In an example where a customer is paying in cryptocurrency and the customer has their own cryptocurrency wallet account associated with the service provider system 902, the customer can send a message signed by its private key including its wallet address (i.e., of the customer) and identifying the cryptocurrency and value to be transferred to the merchant's asset wallet 922. The service provider system 902 can complete the transaction by reducing the cryptocurrency balance in the customer's cryptocurrency wallet and increasing the cryptocurrency balance in the merchant's asset wallet 922. In addition to recording the transaction in the respective cryptocurrency wallets, the transaction can be recorded in the private blockchain 932 and the transaction can be confirmed. A user can perform a similar transaction with cryptocurrency in a peer-to-peer transaction as described above.

While the asset ledger 924 and/or asset wallet 922 are each described above with reference to cryptocurrency, the asset ledger 924 and/or asset wallet 922 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 902 is an aspect of the technology disclosed that enables technical advantages of increased processing speed and improved security.

The description of the environment 900 above generally relates to a centralized service provider system 902 that at least partially facilitates storing and managing assets in the data store 906. However, the environment 900 may also facilitate decentralized storage and management of assets alternatively or in addition to centralized storage and management as described above. For instance, the environment 900 may include a decentralized platform implemented using a plurality of nodes (e.g., web nodes), an example of which is illustrated as node 916. The node 916 is representative of a computer or other device tasked with validating transactions and/or maintaining a copy of a blockchain ledger, such as a ledger associated with the public blockchain 914. The decentralized platform may be implemented via the environment 900 through use of decentralized identifiers and verifiable credentials that are stored and managed by user devices 904. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 902). The decentralized identity referenced by a decentralized identifier gives an entity control over what data can be accessed, stored, modified, and so forth by other entities, such as the service provider system 902.

The node 916, as representative of one of a plurality of decentralized nodes (e.g., decentralized web nodes), supports data storage and relays that allows entities, service provider systems, individuals, organizations and so forth to send, store, and receive encrypted or public messages and data. The node 916 is universally addressable and is "crawlable" using data addressing in relation to the decentralized identifiers. The node 916 is also configured to support decentralized replication of data across the nodes that is consistent across multiple nodes overtime through continued data communication between the nodes in the decentralized platform. The node 916 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 904 may be an issuer, a holder, and/or a verifier, as can the service provider system 902.

In some examples, the user device 904 may implement a wallet application 912 configured to manage decentralized identifiers and/or verifiable credentials. For instance, the wallet application 912 may provide a user interface for implementation of access controls to various data associated with the decentralized identifier by the service provider system 902, to other user devices, and so forth. Additionally, the wallet application 912 may be configured to provide functionality for resource transfers (e.g., cryptocurrency, fiat currency, etc.) with the service provider system 902, other user devices, and the like, based on techniques described herein.

In some examples, the hardware wallet 918 may store cryptocurrency assets in combination with the wallet application 912 and the service provider system 902. For instance, the hardware wallet 918, the wallet application 912, and the service provider system 902 may each store a respective, different private key, where a transaction with the cryptocurrency assets is signed by at least two of the three private keys. The user interface provided by the wallet application 912 may allow a user to request a transaction. The wallet application 912 may then sign the transaction with the private key of the wallet application 912, have either the hardware wallet 918 or the service provider system 902 use a second of the three private keys to sign the transaction, and then provide the transaction with two signatures to the public blockchain 914 for processing.

Figure 10:
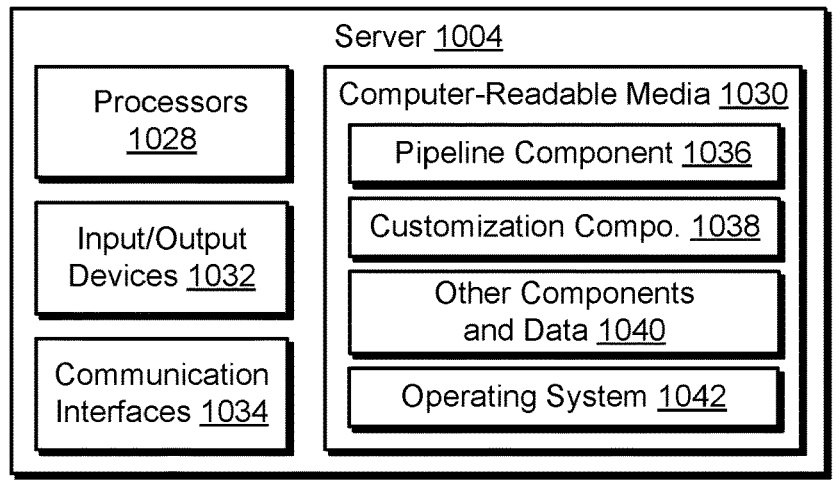
FIG. 10 is a block diagram illustrating a system for performing techniques described herein, in accordance with some examples.
Figure 10:
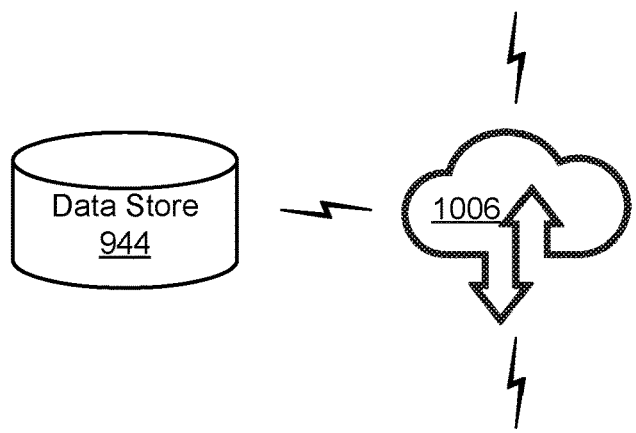
Figure 10:
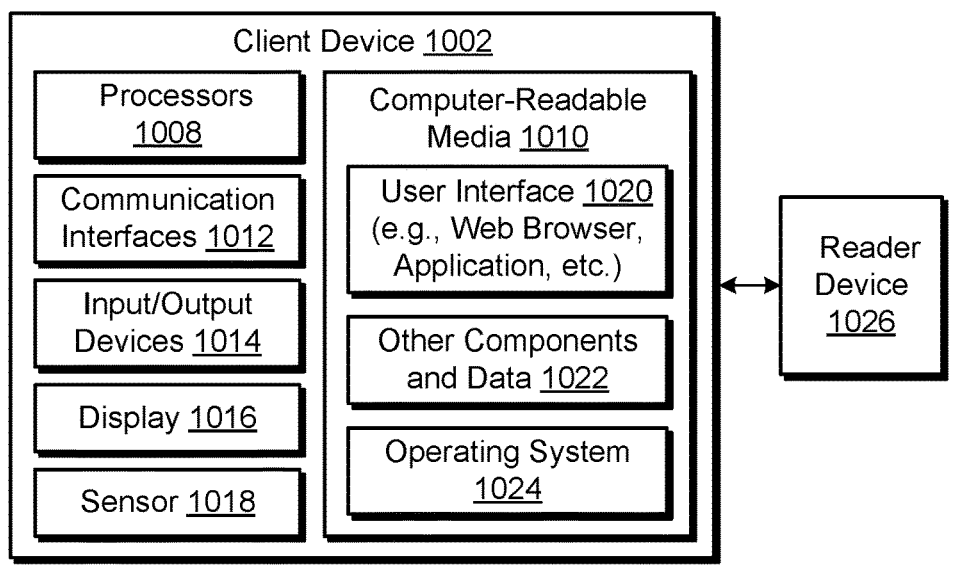

FIG. 10 depicts an illustrative block diagram illustrating a system 1000 for performing techniques described herein. The system 1000 includes a user device 1002, that communicates with server computing device(s) (e.g., server(s) 1004) via network(s) 1006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1002 is illustrated, in additional or alternate examples, the system 1000 can have multiple user devices, as described above with reference to FIG. 8.

In some examples, the client device 1002 can be an example of the client device 120, the client device 240, the client device 245, and/or the client device 305. The server 1004 can be an example of the management system 105, the app repository 117, the customization system 135, the server 350, and/or the application interface customization system 400. The user interface 1020 can be associated with a user interface of the application 125, the application 230, the application 440, the application 450, the application of the process 700, and/or the application of the process 750. The user interface 1020 with host instructions 110 with a guest environment 115, and/or with customized guest instructions 145.

In at least one example, the user device 1002 can be any suitable type of computing device, e.g., portable, semi-portable, semi-stationary, or stationary. Some examples of the user device 1002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1002 can be any computing device capable of sending communications and performing the functions according to the techniques described herein. The user device 1002 can include devices, e.g., payment card readers, or components capable of accepting payments, as described below. The user device 1002 may be representative of, and provide functionality for, the user devices 806 described in relation to FIG. 8.

In the illustrated example, the user device 1002 includes one or more processors 1008, one or more computer-readable media 1010, one or more communication interface(s) 1012, one or more input/output (I/O) devices 1014, a display 1016, sensor(s) 1018, one or more encoders 1046, and one or more decoders 1048.

In at least one example, each processor 1008 can itself comprise one or more processors or processing cores. For example, the processor(s) 1008 can be implemented as one or more microprocessors, microcomputers, microcontrollers, digital signal processors, central processing units, state machines, logic circuitries, and/or any devices that manipulate signals based on operational instructions. In some examples, the processor(s) 1008 can be one or more hardware processors and/or logic circuits of any suitable type specifically programmed or configured to execute the algorithms and processes described herein. The processor(s) 1008 can be configured to fetch and execute computer-readable processor-executable instructions stored in the computer-readable media 1010.

Depending on the configuration of the user device 1002, the computer-readable media 1010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1010 can include, but is not limited to, RAM, ROM, EEPROM, flash memory, solid-state storage, magnetic disk storage, optical storage, and/or other computer-readable media technology. Further, in some examples, the user device 1002 can access external storage, such as RAID storage systems, storage arrays, network attached storage, storage area networks, cloud storage, or any other medium that can be used to store information and that can be accessed by the processor(s) 1008 directly or through another computing device or network. Accordingly, the computer-readable media 1010 can be computer storage media able to store instructions, components or components that can be executed by the processor(s) 1008. Further, when mentioned, non-transitory computer-readable media exclude media such as energy, carrier signals, electromagnetic waves, and signals per se.

The computer-readable media 1010 can be used to store and maintain any number of functional components that are executable by the processor(s) 1008. In some implementations, these functional components comprise instructions or programs that are executable by the processor(s) 1008 and that, when executed, implement operational logic for performing the actions and services attributed above to the user device 1002. Functional components stored in the computer-readable media 1010 can include a user interface 1020 to enable users to interact with the user device 1002, and thus the server(s) 1004 and/or other networked devices. In some examples, the user interface 1020 can include the partial UI 150, the UI 155, the UI 210, the UI 220, a UI associated with the customizable guest instructions 430, a UI associated with the customizable guest instructions 630, the at least one user interface element and user interface displayed at operation 735, the at least one user interface element and user interface displayed at operation 760, or a combination thereof. In at least one example, a user can interact with the user interface via touch input, spoken input, gesture, or any other type of input. The word "input" is also used to describe "contextual" input that may not be directly provided by the user via the user interface 1020. For example, user's interactions with the user interface 1020 are analyzed using, e.g., natural language processing techniques, user movement tracking techniques, eye tracking techniques, etc. to determine context or intent of the user, which may be treated in a manner similar to "direct" user input.

Depending on the type of the user device 1002, the computer-readable media 1010 can also optionally include other functional components and data, such as other components and data 1022, which can include programs, drivers, etc., and the data used or generated by the functional components. In addition, the computer-readable media 1010 can also store data, data structures and the like, that are used by the functional components. Further, the user device 1002 can include many other logical, programmatic and physical components, of which those described are merely examples that are related to the discussion herein.

In at least one example, the computer-readable media 1010 can include additional functional components, such as an operating system 1024 for controlling and managing various functions of the user device 1002 and for enabling user interactions.

The communication interface(s) 1012 can include one or more interfaces and hardware components for enabling communication with various other devices, such as over the network(s) 1006 or directly. For example, communication interface(s) 1012 can enable communication through one or more network(s) 1006, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1002 can further include one or more input/output (110) devices 1014. The I/O devices 1014 can include speakers, a microphone, a camera, and various user controls (e.g., buttons, a joystick, a keyboard, a keypad, etc.), a haptic output device, and so forth. The I/O devices 1014 can also include attachments that leverage the accessories (audio-jack, USB-C, Bluetooth, etc.) to connect with the user device 1002.

In at least one example, user device 1002 can include a display 1016. Depending on the type of computing device(s) used as the user device 1002, the display 1016 can employ any suitable display technology. For example, the display 1016 can be a liquid crystal display, a plasma display, a light emitting diode display, an OLED (organic light-emitting diode) display, an electronic paper display, or any other suitable type of display able to present digital content thereon. In at least one example, the display 1016 can be an augmented reality display, a virtual reality display, or any other display able to present and/or project digital content. In some examples, the display 1016 can have a touch sensor associated with the display 1016 to provide a touchscreen display configured to receive touch inputs for enabling interaction with a graphic interface presented on the display 1016. Accordingly, implementations herein are not limited to any particular display technology. In some examples, the user device 1002 may not include the display 1016, and information can be presented by other means, such as aurally, haptically, etc.

In addition, the user device 1002 can include sensor(s) 1018. The sensor(s) 1018 can include a global positioning system ("GPS") device able to indicate location information. Further, the sensor(s) 1018 can include, but are not limited to, an accelerometer, gyroscope, compass, proximity sensor, camera, microphone, and/or a switch.

In some examples, the GPS device can be used to identify a location of a user. In at least one example, the location of the user can be used by the merchant platform 810, the P2P platform 812, and/or the media content platform 814, described above, to provide one or more services. That is, in some examples, the service provider can implement geofencing to provide particular services to users by the merchant platform 810, the P2P platform 812, and/or the media content platform 814.

In examples, the user device 1002 includes a codec system, which may comprise an encoder 1046 and/or a decoder 1048. The encoder 1046 is configured to encode a data stream or signal from an analog signal (e.g., an analog audio signal, an analog video signal, etc.) to a digital signal for transmission or storage. The decoder 1048 is configured to convert the digital signal back to an analog signal, such as for playback or editing. In some cases, the encoder 1046 may be configured to encode the data stream or analog signal in an encrypted format, and the decoder 1048 may accordingly be configured to decrypt the digital signal as part of the decoding process (e.g., using a cryptographic key). Additionally, in some examples, the encoder 1046 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1046 and/or the decoder 1048 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1000, the server 1004 may include an encoder 1046 and/or a decoder 1048 as well.

Additionally, the user device 1002 can include various other components that are not shown, examples of which include removable storage, a power source, such as a battery and power control unit, a barcode scanner, a printer, a cash drawer, and so forth.

In addition, as described in relation to FIG. 8, the user device 1002 can include, be connectable to, or otherwise be coupled to a reader device 1026, for reading payment instruments and/or identifiers associated with payment objects. The reader device 1026 can include a read head for reading a magnetic strip of a payment card, and further can include encryption technology for encrypting the information read from the magnetic strip. Additionally or alternatively, the reader device 1026 can be an EMV payment reader, which in some examples, can be embedded in the user device 1002. Moreover, numerous other types of readers can be employed with the user device 1002 herein, depending on the type and configuration of the user device 1002.

The reader device 1026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1026 may include hardware implementation, such as slots, magnetic tracks, and rails with one or more sensors or electrical contacts to facilitate detection and acceptance of a payment instrument. That is, the reader device 1026 may include hardware implementations to enable the reader device 1026 to interact with a payment instrument via a swipe, a dip, or a tap to obtain payment data associated with a customer. Additionally or optionally, the reader device 1026 may also include a biometric sensor to receive and process biometric characteristics and process them as payment instruments, given that such biometric characteristics are registered with the payment service and connected to a financial account with a bank server. The reader device 1026 may include processing unit(s), computer-readable media, a reader chip, a transaction chip, a timer, a clock, a network interface, a power supply, and so on. That is, the reader device 1026 may include any of the computing components described herein with reference to the user device 1002 to implement the functionality provided by the reader device 1026.

In examples, the reader device 1026 includes a reader chip, which may perform functionality to control the power supply, among other functionality of the reader device 1026. The power supply may include one or more power supplies such as a physical connection to AC power or a battery. Power supply may include power conversion circuitry for converting AC power and generating a plurality of DC voltages for use by components of reader device 1026. When power supply includes a battery, the battery may be charged via a physical power connection, via inductive charging, or via any other suitable method.

The reader device 1026 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1002, which can be a POS terminal, and the reader device 1026 are shown as separate devices, in additional or alternative examples, the user device 1002 and the reader device 1026 can be part of a single device, which may be a battery-operated device. In some examples, the reader device 1026 can have a display integrated therewith, which can be in addition to (or as an alternative of) the display 1016 associated with the user device 1002.

The server(s) 1004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1004 can include one or more processors 1028, one or more computer-readable media 1030, one or more I/O devices 1032, and one or more communication interfaces 1034. Each processor 1028 can be a single processing unit or a number of processing units, and can include single or multiple computing units or multiple processing cores. The processor(s) 1028 can be implemented as one or more microprocessors, microcomputers, microcontrollers, digital signal processors, central processing units, state machines, logic circuitries, and/or any devices that manipulate signals based on operational instructions. For example, the processor(s) 1028 can be one or more hardware processors and/or logic circuits of any suitable type specifically programmed or configured to execute the algorithms and processes described herein. The processor(s) 1028 can be configured to fetch and execute computer-readable instructions stored in the computer-readable media 1030, which can program the processor(s) 1028 to perform the functions described herein.

The computer-readable media 1030 can include volatile and nonvolatile memory and/or removable and non-removable media implemented in any type of technology for storage of information, such as computer-readable instructions, data structures, program components, or other data. Such computer-readable media 1030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1004, the computer-readable media 1030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1030 can be used to store any number of functional components that are executable by the processor(s) 1028. In many implementations, these functional components comprise instructions or programs that are executable by the processors 1028 and that, when executed, specifically configure the one or more processors 1028 to perform the actions attributed above to the merchant platform 810, the P2P platform 812, and/or the media content platform 814. Functional components stored in the computer-readable media 1030 can optionally include a pipeline component 1036, a customization component 1038, and one or more other components and data 1040. The computer-readable media 1030 can additionally include an operating system 1042 for controlling and managing various functions of the server(s) 1004.

The pipeline component 1036 can be configured to provide an instruction pipeline 405 that can include one or more channels for getting instructions from the management system 105 to the client device 120, for instance including a first channel through the app repository 117 for delivering the host instructions 110 (e.g., with the guest environment 115) to the client device, and including a second channel through the customization system 135 for customizing guest instructions 140 to deliver customized guest instructions 145 to the client device 120.

The customization component 1038 can customize guest instructions (e.g., guest instructions 140, guest instructions 605) to generate customized guest instructions (e.g., customized guest instructions 145, customized guest instructions 630) that are customized for a given platform, app, user, and/or device as discussed herein with respect to the customization system 135, the server 350, and/or the customization system 410.

The one or more other components and data 1040 can include the pipeline component 1036, the customization component 1038, a payment component, a training component, and/or other components discussed herein, the functionality of which is described, at least partially, above. Further, the one or more other components and data 1040 can include programs, drivers, etc., and the data used or generated by the functional components. Further, the server(s) 1004 can include many other logical, programmatic and physical components, of which those described above are merely examples that are related to the discussion herein.

The payment component can be configured to receive transaction data from POS systems. The payment component can transmit requests (e.g., authorization, capture, settlement, etc.) to payment service server computing device(s) to facilitate POS transactions between merchants and customers. The payment component can communicate the successes or failures of the POS transactions to the POS systems.

The training component can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1002 and/or the server(s) 1004 for use at a time after the data models have been trained (e.g., at runtime).

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1034 can include one or more interfaces and hardware components for enabling communication with various other devices, such as over the network(s) 1006 or directly. For example, communication interface(s) 1034 can enable communication through one or more network(s) 1006, which can include, but are not limited any type of network known in the art, as described herein.

The server(s) 1004 can further be equipped with various I/O devices 1032. Such I/O devices 1032 can include a display, various user interface controls (e.g., buttons, joystick, keyboard, mouse, touch screen, biometric or sensory input devices, etc.), audio speakers, connection ports and so forth.

In at least one example, the system 1000 can include a datastore 1044 that can be configured to store data that is accessible, manageable, and updatable. In some examples, the datastore 1044 can be integrated with the user device 1002 and/or the server(s) 1004. In other examples, as shown in FIG. 10, the datastore 1044 can be located remotely from the server(s) 1004 and can be accessible to the server(s) 1004. The datastore 1044 can comprise multiple databases and/or servers connected locally and/or remotely via the network(s) 1006. In at least one example, the datastore 1044 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example aspects of the disclosure include:

Aspect 1. A method for updating a user interface of an application without requiring the application to be updated, the method comprising: providing the application for use by a client device, the application including host instructions having a host memory and a guest environment having a guest memory that is separate from the host memory; receiving guest instructions after providing the application, the guest instructions relating to an update to at least one user interface element that is to be presented via the user interface of the application without requiring the application to be updated; selecting, based on a platform used by the client device, a native user interface type for the at least one user interface element associated with the guest instructions, the native user interface type being selected from a plurality of possible user interface types corresponding to different platforms; bridging at least one interaction between at least one function of the guest instructions and at least one function of the host instructions without sharing memory between the guest memory and the host memory; and causing the application to display, via the user interface, the at least one user interface element associated with the guest instructions according to the native user interface type based on the bridging of the at least one interaction between the at least one function of the guest instructions and the at least one function of the host instructions and without requiring the application to be updated.

Aspect 2. The method of Aspect 1, wherein the plurality of different platforms include a plurality of different operating systems, and wherein the platform used by the client device is an operating system used by the client device.

Aspect 3. The method of any of Aspects 1 to 2, wherein the plurality of different platforms includes a web page configured for viewing using a web browser.

Aspect 4. The method of any of Aspects 1 to 3, wherein the bridging of the at least one interaction includes: receiving at least one value as an output of the at least one function of the host instructions, and providing the at least one value as an input to the at least one function of the guest instructions.

Aspect 5. The method of any of Aspects 1 to 4, further comprising: identifying an application-specific user interface attribute that is specific to the application; and combining the native user interface type with the application-specific user interface attribute to generate a combined user interface type, wherein causing the application to display the at least one user interface element according to the native user interface type includes causing the application to display the at least one user interface element according to the combined user interface type.

Aspect 6. A method for updating a user interface of an application without updating the application, the method comprising: receiving guest instructions for an application to be run on a client device, the application including host instructions having a host memory and a guest environment having a guest memory that is separate from the host memory, the guest instructions relating to an update to at least one user interface element that is to be presented via the user interface of the application; selecting, based on a platform used by the client device, a native user interface type for the at least one user interface element associated with the guest instructions, the native user interface type being selected from a plurality of possible user interface types corresponding to different platforms; and causing the application to display, via the user interface, the at least one user interface element associated with the guest instructions according to the native user interface type.

Aspect 7. The method of Aspect 6, further comprising: providing the application for use by the client device.

Aspect 8. The method of any of Aspects 6 to 7, further comprising: bridging at least one interaction between at least one function of the guest instructions and at least one function of the host instructions without sharing memory between the guest memory and the host memory.

Aspect 9. The method of any of Aspects 6 to 8, wherein causing the application to display the at least one user interface element according to the native user interface type is based on the bridging of the at least one interaction between the at least one function of the guest instructions and the at least one function of the host instructions.

Aspect 10. The method of any of Aspects 6 to 9, wherein the bridging of the at least one interaction includes: receiving at least one value as an output of the at least one function of the host instructions, and providing the at least one value as an input to the at least one function of the guest instructions.

Aspect 11. The method of any of Aspects 6 to 10, wherein the plurality of different platforms include a plurality of different operating systems, and wherein the platform used by the client device is an operating system used by the client device.

Aspect 12. The method of any of Aspects 6 to 11, wherein the plurality of different platforms includes a web page configured for viewing using a web browser.

Aspect 13. The method of any of Aspects 6 to 12, further comprising: identifying an application-specific user interface attribute that is specific to the application; and combining the native user interface type with the application-specific user interface attribute to generate a combined user interface type, wherein causing the application to display the at least one user interface element according to the native user interface type includes causing the application to display the at least one user interface element according to the combined user interface type.

Aspect 14. A system for updating a user interface of an application without updating the application, the system comprising: at least one memory; and at least one processor coupled to the at least one memory, the at least one processor configured to: receive guest instructions for an application to be run on a client device, the application including host instructions having a host memory and a guest environment having a guest memory that is separate from the host memory, the guest instructions relating to an update to at least one user interface element that is to be presented via the user interface of the application; select, based on a platform used by the client device, a native user interface type for the at least one user interface element associated with the guest instructions, the native user interface type being selected from a plurality of possible user interface types corresponding to different platforms; and cause the application to display, via the user interface, the at least one user interface element associated with the guest instructions according to the native user interface type.

Aspect 15. The system of Aspect 14, further comprising any of the operations of any of Aspects 2-5 or 7-13.

Aspect 16. A non-transitory computer-readable medium having stored thereon instructions that, when executed by one or more processors, cause the one or more processors to perform operations according to any of Aspects 1 to 13.

Aspect 17: An apparatus comprising means for performing operations according to any of Aspects 1 to 13.

What is claimed is:

1. A method for updating a user interface of an application without requiring the application to be updated, the method comprising:
   providing the application for use by a client device, the application including host instructions having a host memory and a guest environment having a guest memory that is separate from the host memory;
   receiving guest instructions after providing the application, the guest instructions relating to an update to at least one user interface element that is to be presented via the user interface of the application without requiring the application to be updated, the guest instructions also including guest instruction logic identifying behavior of the application responsive to an interaction with the at least one user interface element;
   selecting, based on a platform used by the client device, a native user interface type for the at least one user interface element associated with the guest instructions, the native user interface type being selected from a plurality of possible user interface types corresponding to different platforms, wherein the native user interface type influences an appearance of the at least one user interface element;

bridging, in response to the interaction with the at least one user interface element, at least one logic interaction between at least one function to be executed as part of the guest instructions according to the behavior indicated by the guest instruction logic and at least one function to be executed as part of the host instructions without sharing memory between the guest memory and the host memory; and causing the application to display, via the user interface, the at least one user interface element associated with the guest instructions according to the appearance influenced by the native user interface type based on the bridging of the at least one logic interaction between the at least one function of the guest instructions and the at least one function of the host instructions and without requiring the application to be updated.

2. The method of claim 1, wherein the different platforms include different operating systems, and wherein the platform used by the client device is an operating system used by the client device.

3. The method of claim 1, wherein the different platforms includes a web page configured for viewing using a web browser.

4. The method of claim 1, wherein the bridging of the at least one logic interaction includes:
receiving at least one value as an output of the at least one function of the host instructions, and
providing the at least one value as an input to the at least one function of the guest instructions.

5. The method of claim 1, further comprising:
identifying an application-specific user interface attribute that is specific to the application; and
combining the native user interface type with the application-specific user interface attribute to generate a combined user interface type, wherein causing the application to display the at least one user interface element according to the native user interface type includes causing the application to display the at least one user interface element according to the combined user interface type.

6. A method for updating a user interface of an application without updating the application, the method comprising:
receiving guest instructions for the application to be run on a client device, the application including host instructions having a host memory and a guest environment having a guest memory that is separate from the host memory, the guest instructions relating to an update to at least one user interface element that is to be presented via the user interface of the application, the guest instructions also including guest instruction logic identifying behavior of the application responsive to an interaction with the at least one user interface element;
selecting, based on a platform used by the client device, a native user interface type for the at least one user interface element associated with the guest instructions, the native user interface type being selected from a plurality of possible user interface types corresponding to different platforms, wherein the native user interface type influences an appearance of the at least one user interface element;

bridging, in response to the interaction with the at least one user interface element, at least one logic interaction between at least one function to be executed as part of the guest instructions according to the behavior indicated by the guest instruction logic and at least one function to be executed as part of the host instructions without sharing memory between the guest memory and the host memory, and causing the application to display, via the user interface, the at least one user interface element associated with the guest instructions according to the appearance influenced by the native user interface type.

7. The method of claim 6, further comprising:
providing the application for use by the client device.

8. The method of claim 6, wherein causing the application to display the at least one user interface element according to the native user interface type is based on the bridging of the at least one logic interaction between the at least one function of the guest instructions and the at least one function of the host instructions.

9. The method of claim 6, wherein the bridging of the at least one logic interaction includes:
receiving at least one value as an output of the at least one function of the host instructions, and
providing the at least one value as an input to the at least one function of the guest instructions.

10. The method of claim 6, wherein the different platforms include different operating systems, and wherein the platform used by the client device is an operating system used by the client device.

11. The method of claim 6, wherein the different platforms includes a web page configured for viewing using a web browser.

12. The method of claim 6, further comprising:
identifying an application-specific user interface attribute that is specific to the application; and
combining the native user interface type with the application-specific user interface attribute to generate a combined user interface type, wherein causing the application to display the at least one user interface element according to the native user interface type includes causing the application to display the at least one user interface element according to the combined user interface type.

13. A system for updating a user interface of an application without updating the application, the system comprising:
at least one memory; and
at least one processor coupled to the at least one memory, the at least one processor configured to:
receive guest instructions for the application to be run on a client device, the application including host instructions having a host memory and a guest environment having a guest memory that is separate from the host memory, the guest instructions relating to an update to at least one user interface element that is to be presented via the user interface of the application, the guest instructions also including guest instruction logic identifying behavior of the application responsive to an interaction with the at least one user interface element;
select, based on a platform used by the client device, a native user interface type for the at least one user interface element associated with the guest instructions, the native user interface type being selected from a plurality of possible user interface types corresponding to different platforms, wherein the native user interface type influences an appearance of the at least one user interface element;

bridge, in response to the interaction with the at least one user interface element, at least one logic interaction between at least one function to be executed as part of the guest instructions according to the behavior indicated by the guest instruction logic and at least one function to be executed as part of the host instructions without sharing memory between the guest memory and the host memory; and cause the application to display, via the user interface, the at least one user interface element associated with the guest instructions according to the appearance influenced by the native user interface type.

14. The system of claim 13, wherein causing the application to display the at least one user interface element according to the native user interface type is based on the bridging of the at least one logic interaction between the at least one function of the guest instructions and the at least one function of the host instructions.

15. The system of claim 13, wherein, to bridge the at least one logic interaction, the at least one processor is configured to:

receive at least one value as an output of the at least one function of the host instructions, and provide the at least one value as an input to the at least one function of the guest instructions.

16. The system of claim 13, wherein the different platforms include different operating systems, and wherein the platform used by the client device is an operating system used by the client device.

17. The system of claim 13, wherein the different platforms includes a web page configured for viewing using a web browser.

18. The system of claim 13, the at least one processor configured to:

identify an application-specific user interface attribute that is specific to the application; and combine the native user interface type with the application-specific user interface attribute to generate a combined user interface type, wherein causing the application to display the at least one user interface element according to the native user interface type includes causing the application to display the at least one user interface element according to the combined user interface type.

19. The method of claim 6, wherein the interaction with the at least one user interface element is associated with an input received at an input interface.

20. The system of claim 13, wherein the interaction with the at least one user interface element is associated with an input received at an input interface.

* * * * *